US011074540B2

(12) United States Patent
Sweeney et al.

(10) Patent No.: US 11,074,540 B2
(45) Date of Patent: Jul. 27, 2021

(54) NETWORK SYSTEM INCLUDING DRONES

(71) Applicant: Uber Technologies, Inc., San Franciso, CA (US)

(72) Inventors: Matthew Sweeney, San Francisco, CA (US); Nikhil Goel, San Francisco, CA (US); Mark Moore, San Francisco, CA (US); Jeffrey A. Holden, San Francisco, CA (US)

(*) Notice: Subject to any disclaimer, the term of this patent is extended or adjusted under 35 U.S.C. 154(b) by 360 days.

(21) Appl. No.: 15/952,815

(22) Filed: Apr. 13, 2018

(65) Prior Publication Data
US 2019/0108472 A1 Apr. 11, 2019

Related U.S. Application Data

(60) Provisional application No. 62/570,232, filed on Oct. 10, 2017.

(51) Int. Cl.
*G06Q 10/08* (2012.01)
*B64C 39/02* (2006.01)

(52) U.S. Cl.
CPC ......... *G06Q 10/083* (2013.01); *B64C 39/024* (2013.01); *B64C 2201/024* (2013.01); *B64C 2201/128* (2013.01); *B64C 2201/208* (2013.01)

(58) Field of Classification Search
CPC ................ G06Q 10/083; B64C 39/024; B64C 2201/024; B64C 2201/128; B64C 2201/208
USPC .......................................................... 701/94
See application file for complete search history.

(56) References Cited

U.S. PATENT DOCUMENTS

| 9,387,928 | B1* | 7/2016 | Gentry | G08G 5/0052 |
|---|---|---|---|---|
| 9,984,347 | B2* | 5/2018 | Dreano, Jr. | A47G 29/141 |
| 10,248,120 | B1* | 4/2019 | Siegel | G05D 1/0223 |
| 10,249,200 | B1* | 4/2019 | Grenier | G05D 1/0088 |
| 2014/0164126 | A1 | 6/2014 | Nicholas et al. | |
| 2015/0120094 | A1* | 4/2015 | Kimchi | G05D 1/00 701/3 |
| 2015/0370251 | A1* | 12/2015 | Siegel | G05D 1/00 701/2 |
| 2015/0379468 | A1* | 12/2015 | Harvey | G06Q 10/08355 705/338 |

(Continued)

OTHER PUBLICATIONS

PCT International Search Report and Written Opinion, PCT Application No. PCT/IB2018/057708, dated Feb. 13, 2019, 15 pages.

*Primary Examiner* — Peter D Nolan
*Assistant Examiner* — Wae L Louie
(74) *Attorney, Agent, or Firm* — Dority & Manning, P.A,

(57) ABSTRACT

A network system provides delivery of items using unmanned aerial vehicles (UAV) or drones. The network system uses an infrastructure of nodes that include landing pads to dock drones, as well as interfaces to provide and receive items from docked drones. Nodes may be stationary (e.g., fixed at a building rooftop or public transit station) or mobile (e.g., mounted to a vehicle). The network system may determine a route for delivery of an item, where a drone transports the item for at least a portion of the route. For example, the route may include multiple waypoints associated with nodes between which drones travel. For other portions of the route, the network system may request a provider to transport the item using a ground-based vehicle.

20 Claims, 17 Drawing Sheets

(56) References Cited

U.S. PATENT DOCUMENTS

| | | | |
|---|---|---|---|
| 2016/0070264 A1* | 3/2016 | Hu | G08G 5/04 |
| | | | 701/2 |
| 2016/0185466 A1* | 6/2016 | Dreano, Jr. | G06Q 30/0635 |
| | | | 705/26.81 |
| 2016/0200438 A1* | 7/2016 | Bokeno | B60L 53/53 |
| | | | 244/2 |
| 2016/0257423 A1* | 9/2016 | Martin | B64F 1/00 |
| 2017/0175413 A1* | 6/2017 | Curlander | B64F 1/10 |
| 2018/0137454 A1* | 5/2018 | Kulkarni | G08G 5/0034 |
| 2019/0066041 A1* | 2/2019 | Hance | G05D 1/021 |
| 2019/0108472 A1* | 4/2019 | Sweeney | B64C 39/024 |
| 2019/0220819 A1* | 7/2019 | Banvait | G05D 1/0088 |

* cited by examiner

300

NETWORK SYSTEM INCLUDING DRONES

CROSS-REFERENCE TO RELATED APPLICATION

This application claims priority under 35 U.S.C. § 119(e) to U.S. Provisional Patent Application No. 62/570,232 filed on Oct. 10, 2017, which is incorporated by reference herein in its entirety.

BACKGROUND

Field

This disclosure generally relates to a network system including drones, and to delivery of items using drones.

Description of the Related Art

Conventional delivery systems provide delivery of items using ground-based vehicles such as cars and trucks. For example, system users may order food from a restaurant, and personnel of the restaurant drive vehicles to transport the food from the restaurant to the users. However, the proximity between restaurants and a user may limit the selection of restaurants from which the user can order food for delivery. Additionally, deliveries may be delayed if a user orders from a restaurant that is located farther away from the user, if there is traffic from vehicles on the road, or due to other factors such as geographical obstacles.

SUMMARY

A network system provides delivery of items using unmanned aerial vehicles (UAV), referred to herein as "drones." The network system uses an infrastructure of nodes that include landing pads to dock drones, as well as interfaces to provide and receive items from docked drones. Nodes may be stationary (e.g., fixed at a building rooftop or public transit station) or mobile (e.g., mounted to a vehicle). For example, a node is integrated with a building of a restaurant that provides food items to users. Nodes may include a fiducial for determining a landing zone of drones. Furthermore, nodes may include mechanisms to launch drones or to charge or swap batteries of drones. The network system may determine a route for delivery of an item, where a drone transports the item for at least a portion of the route. For example, the route may include multiple waypoints associated with nodes between which drones travel. For other portions of the route, the network system may request a provider to transport the item using a ground-based vehicle. To increase efficiency of deliveries, the network system may aggregate multiple orders such that a drone transports items from the orders between common nodes or overlapping segments of routes, especially in busy urban areas.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
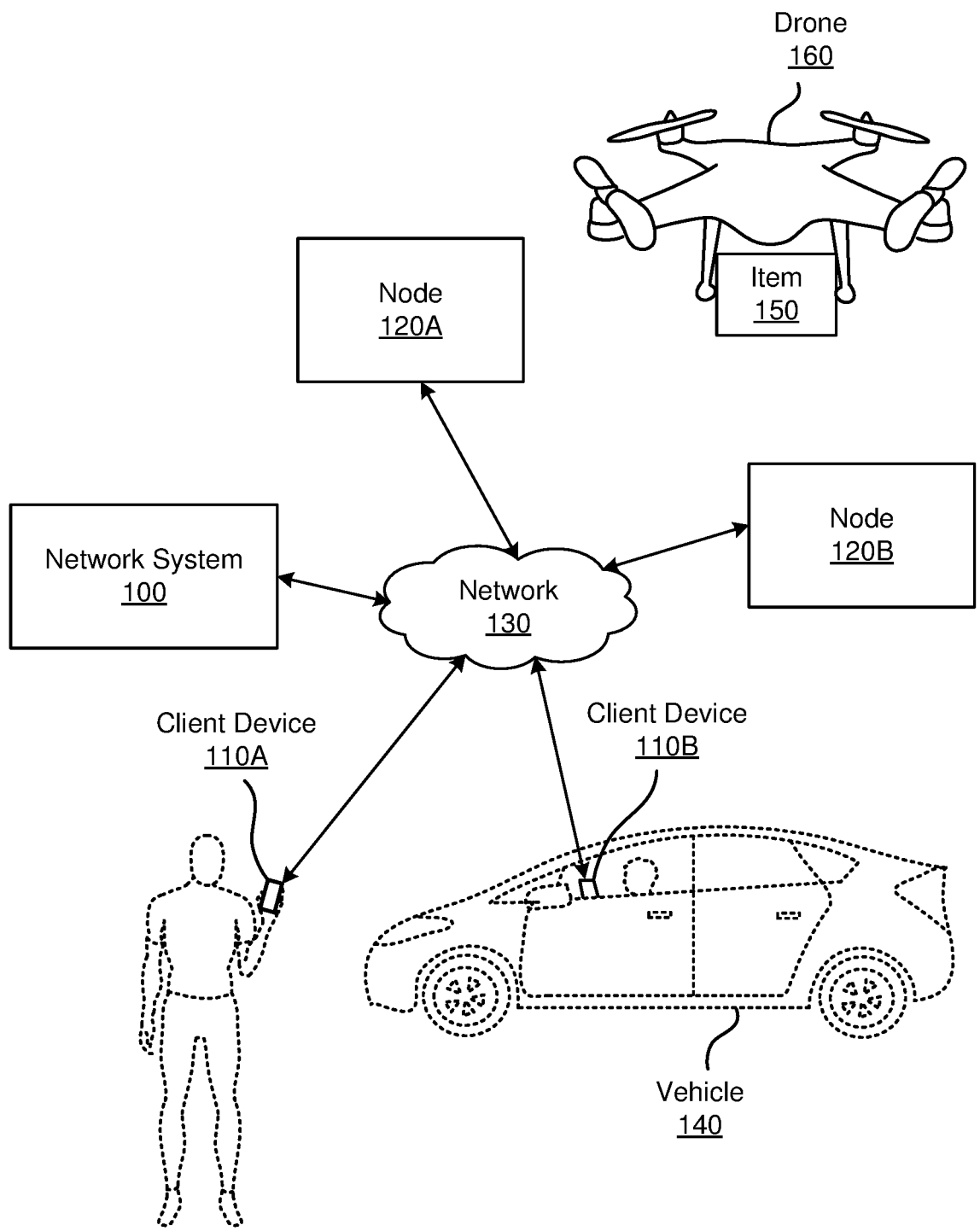
FIG. 1 is a diagram of a system environment for a network system according to an embodiment.

FIG. 1 is a diagram of a system environment for a network system 100 according to one embodiment. Users of the network system 100 include providers that provide service to other users. In an example use case, a provider operates a vehicle 140 to transport an item 150 from a first location (e.g., an "origin location") to a second location (e.g., a "destination location"). The network system 100 may determine origin locations and coordinate providers to pick up items at the origin locations. Types of items 150 include but are not limited to mail, packages, consumable items, raw goods, etc., and may be available from one or more third parties or "item providers." In some embodiments, a provider may pick up items 150 from one or more nodes 120. Additionally, an unmanned aerial vehicle (UAV) 160, also known as a drone 160, may transport items 150 between different nodes 120. For instance, as shown in FIG. 1, the drone 160 may transport the item 150 from node 120A to node 120B, where the provider picks up the item 150 for delivery to a user. Nodes 120 may be stationary (e.g., a building or fixed structure such as a streetlight or bus stop) or mobile (e.g., mounted on a vehicle or otherwise transportable) and located at waypoints of routes for delivery of items. Nodes 120 may be the vehicle 140 itself or any form of suitable mobile transport for the item to be delivered. For purposes of explanation, we describe use cases where the items are consumable items and the nodes may be located at or nearby restaurants (or relevant locations of item providers such as a warehouse storing food or drink supplies) or mounted to (or part of) a ground-based vehicle. However, the embodiments described herein may be adapted to other applications. In addition, though UAV type drones 160 are described for purposes of explanation, the embodiments described herein may be adapted to rolling drones 160 other types of mobile systems. A rolling drone 160 or "sidewalk robot" may include wheels for navigating on sidewalks, roads, or other ground surfaces at pedestrian-like speeds, e.g., to avoid safety incidents.

The system environment includes the network system 100, one or more client devices 110 of users of the network system 100, one or more nodes 120, and one or more drones 160. In the embodiment of FIG. 1, a user uses client device 110A and a provider uses client device 110B to interact with the network system 100. The network system 100 and client devices 110 may be connected to each other via a network 130. In some embodiments, one or more drones 160 or nodes 120 are connected to the network system 100 via the network 130. In other embodiments, a drone 160 or node 120 may not necessarily be connected to the network system 100 though may receive information from (or provide information to) the network system 100 via another component of the system environment, e.g., a client device 110 or another node 120. In other embodiments, different or additional entities can be included in the system environment. The functions performed by the various entities of FIG. 1 may vary in different embodiments.

A user can interact with the network system 100 through the client device 110, for example, to request service (e.g., receiving delivery of an item) or to receive requests to provide service (e.g., delivering an item). A client device 110 can be a personal or mobile computing device, such as a smartphone, a tablet, or a notebook computer. In some embodiments, the client device 110 executes a client application that uses an application programming interface (API) to communicate with the network system 100 through the network 130. The client application of the client device 110 can present information received from the network system 100 on a user interface, such as a delivery route on geographic map, current location of the client device 110 or an item 150 for delivery, notifications about a delivery, etc. In some embodiments, the client application running on the client device 110 can determine a current location using one or more sensors of the client device 110, such as a global positioning system (GPS) receiver, and provide the current location of the client device 110 to the network system 100.

The network system 100 may include a map database storing map information of geographic regions in which the network system 100 offers services such as delivery or transportation for users. The map information may include map properties of a geographical region such as road properties that describe characteristics of the road segments, such as speed limits, road directionality (e.g., one-way or two-way), traffic history, traffic conditions, addresses on the road segment, length of the road segment, and type of the road segment (e.g., surface street, residential, highway, toll). The map information may also include locations and information associated with nodes 120, waypoints (e.g., at which stationary nodes 120 are located), and other points-of-interest (e.g., restaurants, shopping centers, commercial or residential buildings, warehouses, etc.) in a geographical region. The network system 100 may use the map database along with locations of client devices 110 to determine navigation information (e.g., routes for a drone 160 or vehicle 140), origin locations, destination locations, or intermediate locations (e.g., en route from an origin and destination location) for delivery of items 150 to users.

For convenience, we presume here that the vehicle 140 is a car, operated by a driver, as an example provider. However, the embodiments described herein may be adapted for a provider operating alternative vehicles (e.g., bicycle, motorcycle, boat, airplane, helicopter, VTOL, etc.) or vehicles that do not necessarily need to be operated by a person. For instance, the provider may be an autonomous vehicle 140 that receives routing instructions from the network system 100 (or from a local navigation system).

In some embodiments, a provider can receive invitations or assignment requests through a client device 110. The network system 100 identifies a user who submitted an assignment request and determines an origin location and/or destination location for the requested service. For example, the network system 100 receives a request for delivery of an item from a client device 110 of a user, selects a provider from a pool of available (or "open") providers to provide the delivery, e.g., based on the vehicle type, the origin location, the destination location, locations of nodes 120, or item providers. The network system 100 transmits information associated with the assignment request to the selected provider's client device 110.

Client devices 110 can communicate with the network system 100 via the network 130, which may comprise any combination of local area and wide area networks employing wired or wireless communication links. In one embodiment, the network 130 uses standard communications technologies and Internet protocols. For example, the network 130 includes communication links using technologies such as the Internet, 3G, 4G, BLUETOOTH®, or Wi-Fi. In some embodiments, all or some of the communication links of the network 130 may be encrypted.

A drone 160 is an aerial device that does not have a human operator onboard. The drone 160 may include any number of sensors for data collection, navigation, landing, or other functionality. Additionally, the drone 160 may include one or more motors (e.g., electric motors) for actuating one or more rotors. In some embodiments, each rotor has a corresponding motor, e.g., that may be controlled independently from the other motors. A drone 160 that includes four rotors may be known as a "quadcopter." An onboard battery (e.g., up to 15 pounds in weight), which in one embodiment is rechargeable, provides power for the motors as well as other functionality of the drone 160. In some embodiments, a drone 160 may be a zero-emission and all-electric device (or low-emission and at least partially electric), which may reduce noise pollution to surrounding areas and communities. For instance, the drone 160 produces noise at 65 dB or less at a height of 15 feet from the ground. The drone 160 may include landing gear to land and launch from a node 120, e.g., a drone interface or surface such as the ground or a top of a building, vehicle 140, or another structure. Drones 160 may land and launch from various heights, e.g., approximately five feet or 13 feet, and have a cruise altitude of up to 400 or 1000 feet. In some embodiments, drones 160 have a fixed wing architecture and a wingspan of up to five or six feet. Drones 160 may switch from a flying configuration to a more compact configuration for stowage. In some embodiments, a drone 160 may travel at speeds between 50-100 miles per hour and have a range of travel (e.g., under a battery charge) of 10-25 miles or more.

The drone 160 includes an interface for receiving, stowing, and providing one or more items 150. For example, the interface includes active and/or passive mechanisms that couple to an item 150 and secure the item 150 with the drone 160 during transportation in flight. In addition, the mechanisms may decouple the item 150 from the drone 160 upon landing, e.g., to provide the item 150 to a node 120, to a provider for pickup, or to a user for delivery. In an embodiment, the mechanism includes an actuated mechanical arm with a grip interface to attach and de-attach the item 150. The interface may also include a protective cover to shield at least part of the item 150 during transport, thus reducing the likelihood of the item 150 becoming damaged or contaminated. In some embodiments, the interface includes a temperature-controlled unit for maintaining a temperature of the item 150. For instance, the temperature-controlled unit may keep an item 150 at a target temperature depending on certain types of consumable goods in the item 150 (e.g., warm for soup or cold for ice cream). In some embodiments, a drone 160 may transport a payload having dimensions up to 130 millimeters (mm)×330 mm×195 mm (for width, length, and height), 140 mm×320 mm×168 mm, or 5 inches×13 inches×7.6 inches. Further, the drone 160 may transport a payload, e.g., having a weight up to 4.3-4.5 pounds.

Figure 2A:
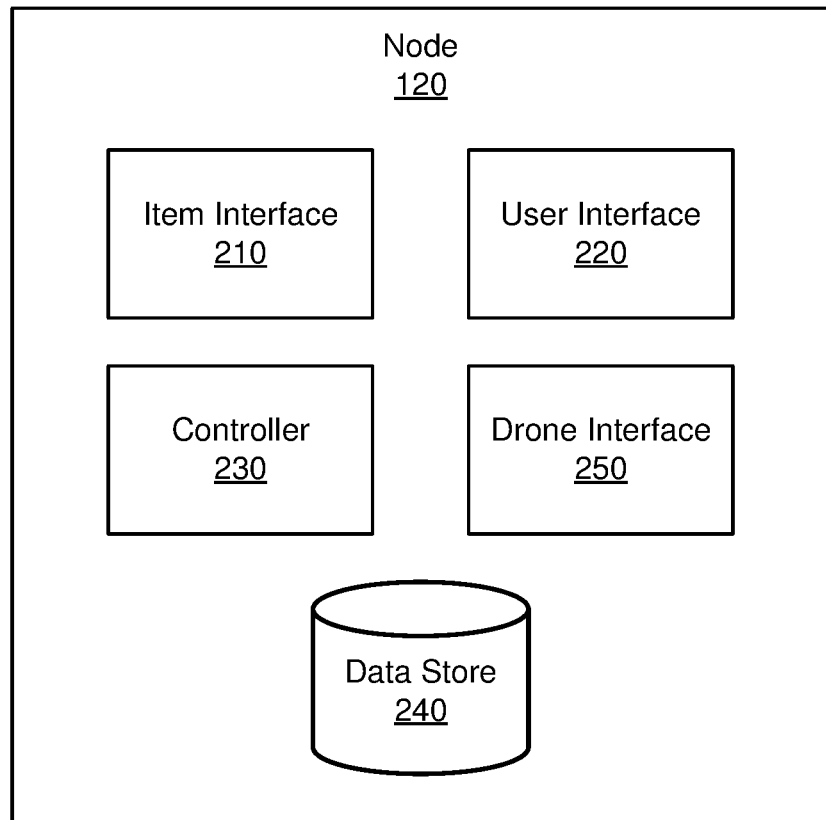
FIG. 2A is block diagram of a node of the network system according to an embodiment.

FIG. 2A is block diagram of a node 120 of the network system 100 according to an embodiment. A node 120 may include an item interface 210, user interface 220, controller 230, data store 240, and drone interface 250. In other embodiments, the node 120 may include additional, fewer, or different components. To maintain a compact size (e.g., for mounting and transportation on a vehicle or integration as part of the vehicle), a mobile node 120 may include fewer components than a stationary node. For instance, a mobile node 120 may not necessarily include a user interface 220, controller 230, or data store 240. The components may include any number of mechanical, hardware, software components, or a combination thereof. In some embodiments, a node 120 may fit in a spot for a vehicle in a parking lot. In other embodiments, a node 120, or some components of a node 120, may be integrated as part of a structure or building such as a restaurant, warehouse, delivery center, food truck or top/outer surface of a ground-based vehicle, or transit station. In some embodiments, a node 120 may be a standalone device.

The item interface 210 receives and provides items 150 to drones 160, users, or providers of the network system 100. Items 150 may be included in one or more predetermined types of receptacles, for example, having known dimensions, volume, and/or weight (e.g., weight of the receptacle or a maximum allowable weight of items 150 transported in the receptacle) for compatibility with nodes 120, drones 160, and/or vehicles 140. In some use cases, a receptacle is a rectangular-shaped bin having a known width, length, and height. A receptacle may include a latch to secure items 150 during transportation. Moreover, a receptacle may include identifying information (e.g., a tag, QR code, or other barcode), which may indicate an origin location, destination location, or type of a corresponding item 150. In some embodiments, the item interface 210 may also receive and provide items 150 not included in a receptacle. Once the item interface 210 receives these items 150, the item interface 210 may place or sort these items 150 into a receptacle for transportation. The receptacle may include insulation to keep contents of the item 150 hot or cold. The item interface 210 includes storage for received items 150 that are awaiting pickup.

The item interface 210 may include a window or slot where an item 150 (which may or may not be in a receptacle) may be dropped off (e.g., by a person, robot, vehicle, etc.) for transportation. For example, personnel of a restaurant (e.g., an item provider) provides consumable goods to a node 120 via the item interface 210. The personnel may be a courier that carries the consumable goods from a kitchen of the restaurant and walks over to the node 120. The item interface 210 may also include a temperature-controlled unit to keep an item 150 at a target temperature. The temperature-controlled unit may determine a target temperature setting for a certain item 150 based on determining the corresponding identifying information, e.g., by scanning a barcode of the receptacle, or by receiving information about the delivery from the network system 100. In some embodiments, the temperature-controlled unit of the item interface 210 may provide target temperature information to a temperature-controlled unit of a drone 160.

Users or providers of the network system 100 may also pick up items 150 from the item interface 210. The item interface 210 may include one or more security devices to determine whether an intended recipient (e.g., a user, item provider, or provider) is trying to pick up an item 150. For example, the item interface 210 releases an item 150 (e.g., by unlocking a holding area) responsive to receiving valid credentials. The intended recipient may input credentials (e.g., a username, password, or biometrics) via the user interface 220, which is further described below. In some embodiments, the item interface 210 may include a sensor configured to detect short-range transmissions, e.g., BLUETOOTH® or near-field communication (NFC), of a client device 110. Based on the detected transmissions, the item interface 210 can determine whether the client device 110 is associated with the intended recipient, and thus make the item 150 available for pickup.

The user interface 220 presents information about items 150 to users or providers of the network system 100. The user interface 220 may include a display device, audio device, or other types of devices to present the information. Additionally, the user interface 220 may include any number of user input devices (e.g., a touchscreen, keyboard, buttons, etc.) to receive user input such as credentials to pick up an item 150 from the node 120, or drop off an item 150 at the node 120. The presented information may indicate items 150 currently stored at the node 120, items 150 scheduled by the network systems 100 for delivery to the node 120, or a history of items 150 delivered or picked up from the node 120. Further, the presented information may describe an item 150, e.g., an origin location, destination location, delivery route, or contents of the item 150.

In some embodiments, the controller 230 enables communication between the node 120 and the network system 100 or client devices 110 via the network 130. The controller 230 may receive information for services (or user information) from the network system 100 or client devices 110. The information may be stored in the data store 240 and retrieve from the data store 240 by various components of the nodes 120. In some embodiments, the data store 240 may also include a local map database, which is substantially the same as, or a subset of, the map database of the network system 100 as previously described with respect to FIG. 1. Thus, the node 120 may not necessarily need to communicate with the network system 100 to receive map information in real-time. In an example use case, the information includes navigation information for delivery of an item 150. The navigation information may indicate a determined trajectory (e.g., including a bearing and distance) for a drone 160 to transport the item 150 from the node 120 to a destination location, or to another intermediate location as part of a route to the destination location. Based on the navigation information and/or map information, the controller 230 may determine and provide instructions to the drone interface 250 to launch the drone 160 transporting the item 150.

The drone interface 250 enables one or more drones 160 to land and launch from the node 120. In particular, the drone interface 250 may include a landing pad for docking a drone 160 transporting one or more items 150 (or not transporting any items 150 yet). The drone interface 250 may include one or more fiducials, for example, visual markers or alignment devices (e.g., on the landing pad), for determining a landing location or assisting with landing a drone 160 to a docked position. A fiducial may be an approved code (e.g., bar code or QR code), or image. Additionally, a fiducial may be mobile, for instance, printed on a piece of paper or other suitable material. In some use cases, the fiducial is waterproof, water-resistant, or otherwise protected, e.g., to reduce wear and tear. A fiducial may also be printed on a node 120, for example, on a surface of a vehicle 140, another structure, or the ground. A courier (e.g., provider or item provider) may relocate (e.g., by foot or bike) a fiducial to a selected landing zone at a waypoint or may re-use the fiducial for different deliveries or nodes 120. In some embodiments, drones 160 may use other types of interfaces different from fiducials for determining landing locations or nodes 120. For example, a drone 160 may use Bluetooth Low Energy (BLE), radio-frequency identification (RFID), WIFI, or other types of transmission (e.g., non-visible to humans) to receive or transmit communication to a client device 110, for instance, that is located inside a vehicle 140 coupled with a node 120.

In some embodiments, the landing pad is coupled to the item interface 210 for receiving items 150 delivered by drones 160 (e.g., once landed or docked), and for providing other items 150 from the node 120 to the drones 160 for delivery to other locations. The landing pad may include a charger to charge a battery of the drone 160, or a mechanism to swap a battery of the drone 160. For example, responsive to determining that a battery of the drone 160 has a charge less than a threshold level, the drone interface 250 determines to charge the battery or to swap the battery with another battery having at least the threshold level of charge. The charger may include a charging port that physically couples to the drone 160, or may wirelessly charge the drone 160, e.g., using inductive or resonance charging. Further, the drone interface 250 may include a hanger for stowing of docked drones 160 that have not yet launched.

In some embodiments, the drone interface 250 includes a launch mechanism coupled to the launching pad to launch drones 160 transporting items 150 from the node 120. The launch mechanism may include a catapult, spring-loaded platform, robotic arm, actuated rails, any combination thereof, or any other suitable mechanism for launching a drone 160. The launch mechanism may receive a destination for an item 150 from the controller 230 communicatively coupled to the launch mechanism and launch a drone 160 toward the destination. For example, the launch mechanism aligns the drone 160 to a target bearing and launches the drone 160 to follow a determined trajectory based on a distance to the destination. The controller 230 may determine the trajectory by taking into account weather conditions such as wind direction and speed.

Figure 2B:
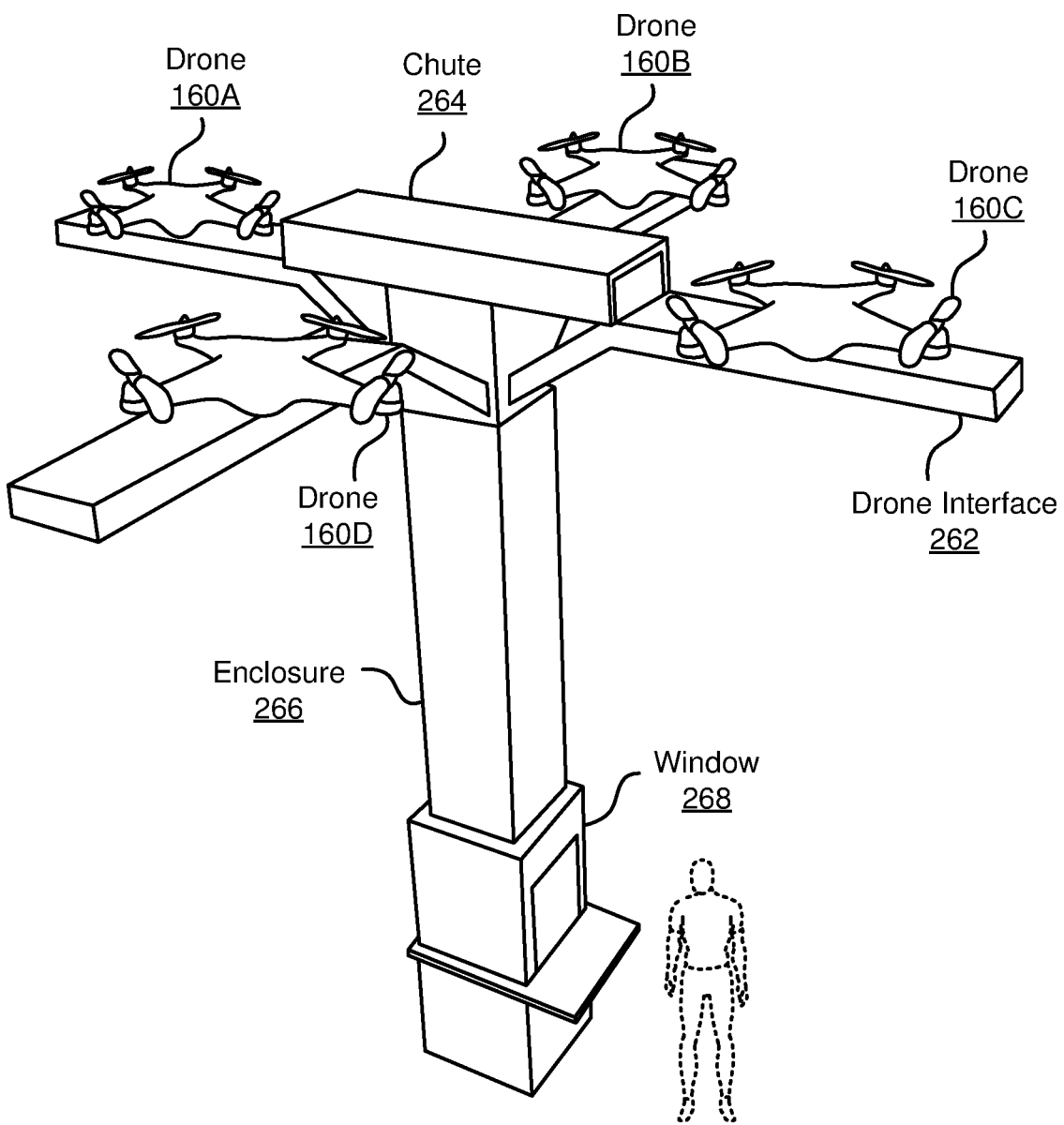
FIG. 2B illustrates a node according to an embodiment.

FIG. 2B illustrates a node 260 according to an embodiment. The node 260 includes a drone interface 262 having four landing pads for docking drones 160A, 160B, 160C, and 160D. In other embodiments, the drone interface 262 may include a different number of landing pads. The node 260 also includes a chute 264, enclosure 266, and window 268 as part of an item interface. The chute 264 may receive and provide items (or receptacles carrying items) from the drones 160. The drone interface 262 may transport items from the chute 264 to the window 268 via the enclosure 266. For example, the enclosure 266 may have an actuation system including a conveyor, rollers, or elevator mechanisms. A user or provider can pick-up or drop-off items from the window 268 positioned at approximately waist height. Additionally, the enclosure 266 may include compartments to store items (e.g., up to 30 or more separate compartments) until a user or provider arrives at the window 268 for pick-up.

Figure 2C:
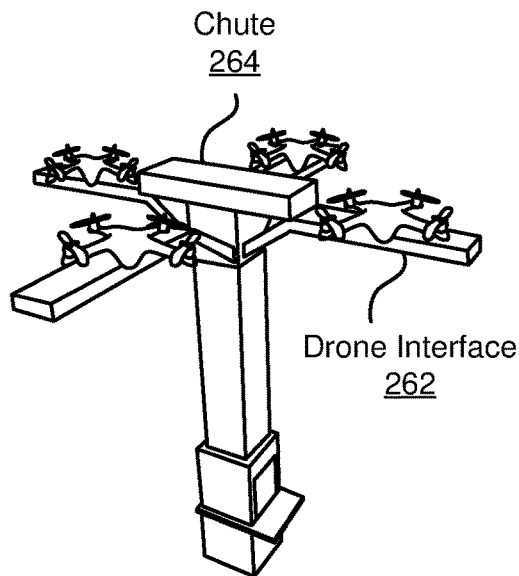
FIGS. 2C, 2D, and 2E illustrate configurations of a node according to various embodiments.
Figure 2D:
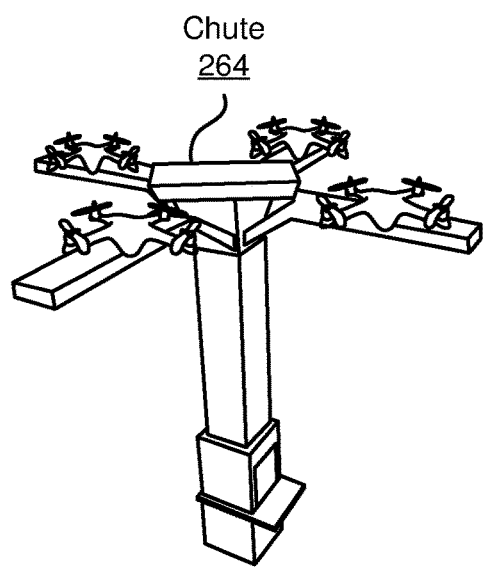
Figure 2E:
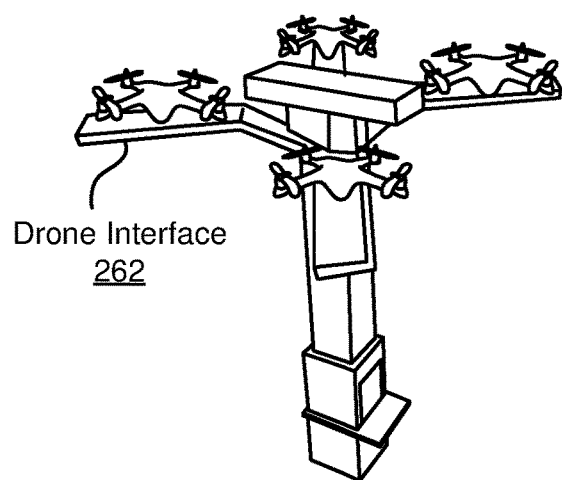

FIGS. 2C, 2D, and 2E illustrate configurations of a node according to various embodiments. In the embodiment shown in FIG. 2D, the chute 264 of the node may rotate to provide or receive items from drones 160 on different landing pads, e.g., which remain stationary. In the embodiment shown in FIG. 2E, the landing pads of the drone interface 262 may rotate to align different landing pads to the chute 264, e.g., which remains stationary.

Figure 2F:
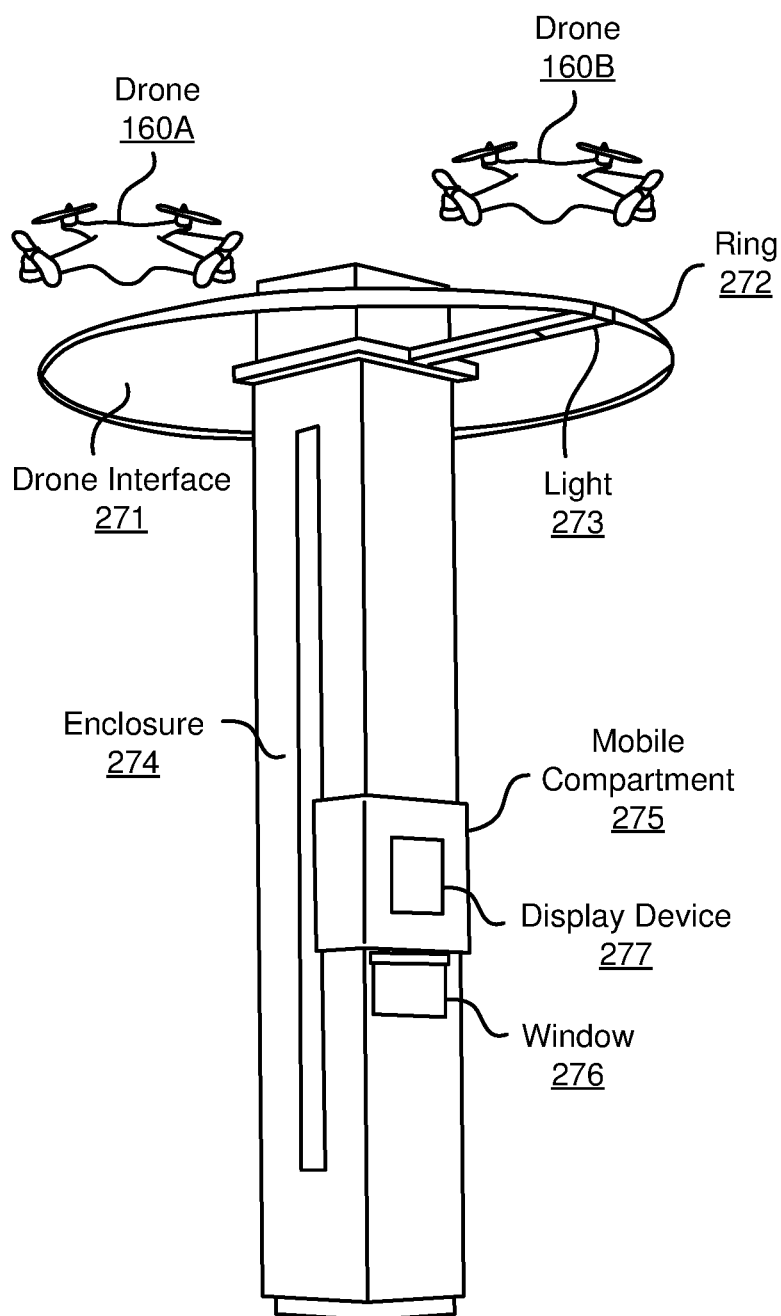
FIG. 2F illustrates another node according to an embodiment.

FIG. 2F illustrates another node 270 according to an embodiment. The node 270 has a drone interface 271 including a circular-shaped landing pad bordered by a "halo" ring 272. The ring 272 may emit light to assist drones 160A and 160B in locating and docking (e.g., as a fiducial) on the landing pad. Multiple drones 160 may be docked on the landing pad and the drones 160 may transfer items between each other while docked on the landing pad. The drone interface 271 may also include a light 273 that emits light downwards for visibility of a user or provider. The node 270 includes an enclosure 274 as part of an item interface. The node 270 includes a mobile compartment 275, display device 277, and window 276 as part of the user interface. The mobile compartment 275 may be transported between the drone interface 271 and the window 276 via an actuation mechanism in the enclosure 274 (e.g., conveyor belt). The display device 277 may have a transflective screen to provide visibility in a range of ambient outdoor lighting conditions (e.g., direct sunlight during the day or darkness at night).

Figure 2G:
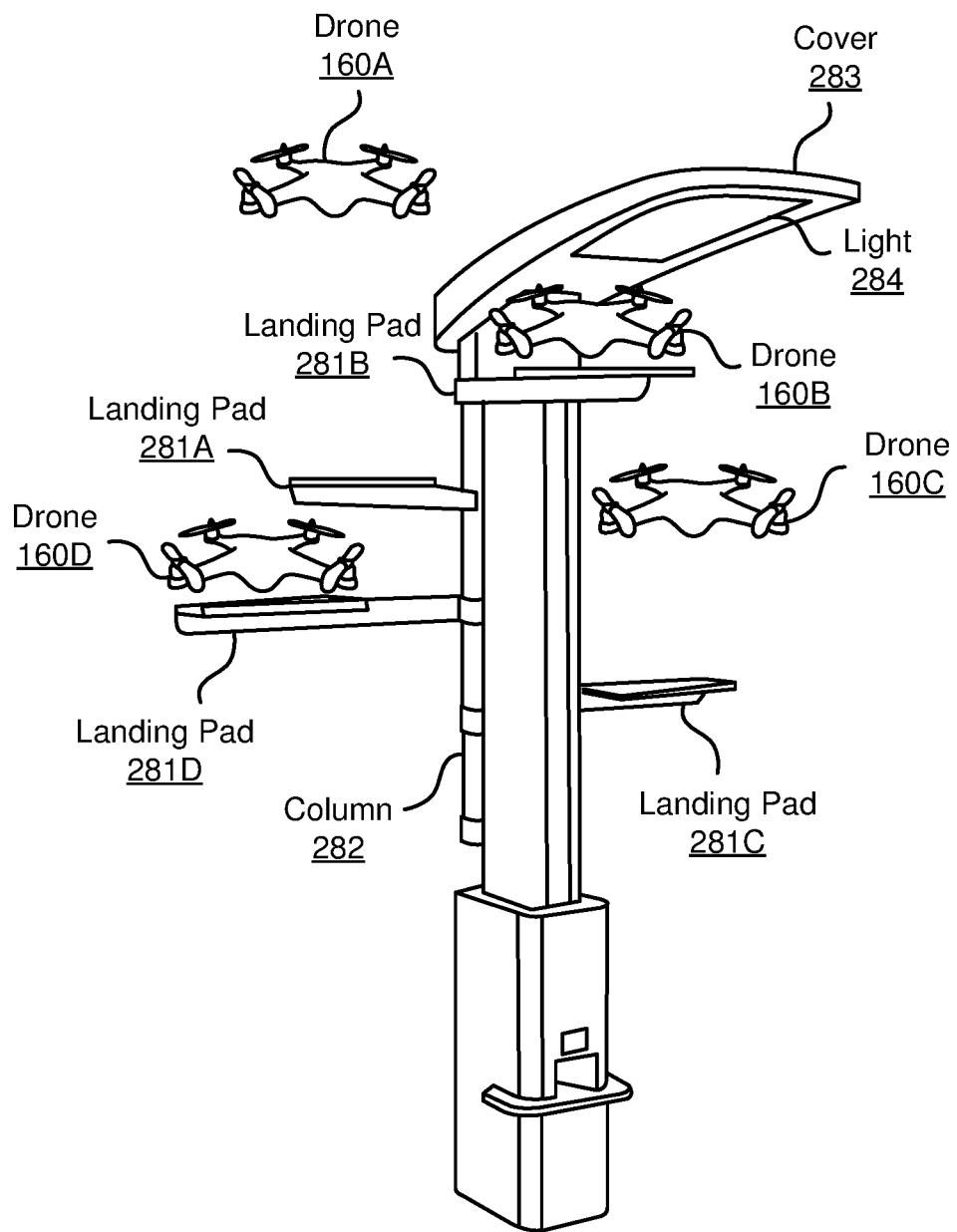
FIG. 2G illustrates a node with landing pads according to an embodiment.
Figure 2H:
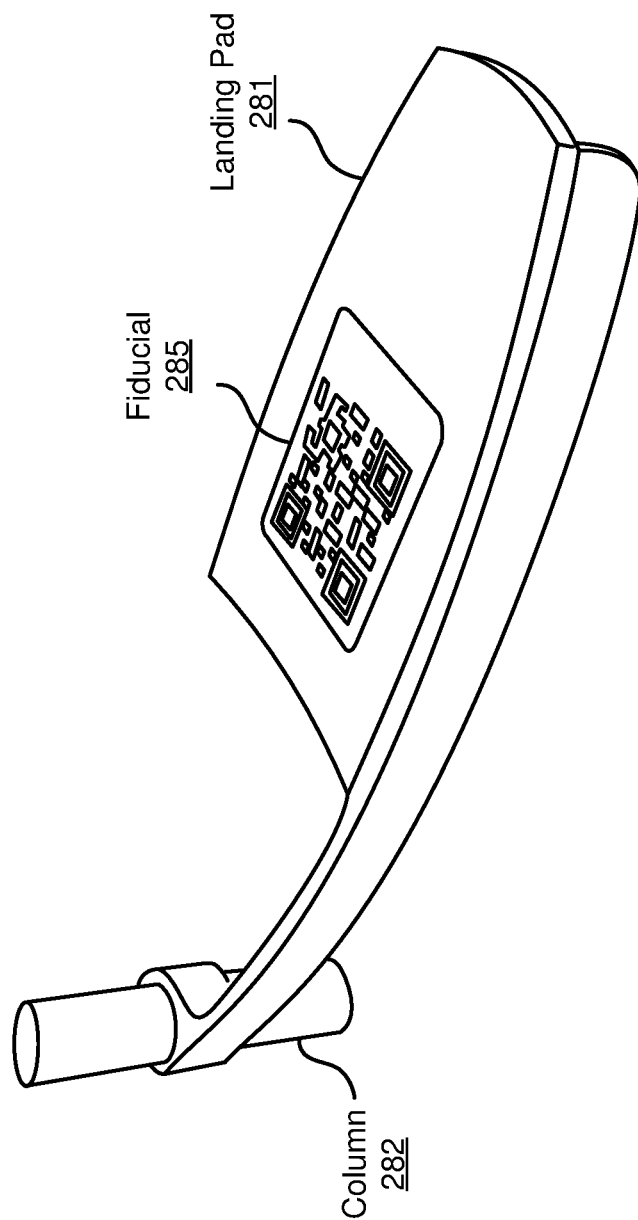
FIG. 2H illustrates a landing pad with a fiducial according to an embodiment.

FIG. 2G illustrates a node 280 with landing pads according to an embodiment. FIG. 2H illustrates a landing pad 281 with a fiducial 285 (e.g., a QR code) according to an embodiment. As shown in the embodiment of FIG. 2G, a drone interface of the node 280 includes landing pads 281A, 281B, 281C, and 281D coupled to a column 282. The drone interface may rotate the landing pads around the column 282, for example, to provide more clearance for facilitating (e.g., simultaneous) docking of the drones 160A, 160B, 160C, and 160D. In other embodiments, the drone interface may include a different number of configurable landing pads coupled to the column 282. Further, the drone interface may rotate the landing pads to be positioned under the cover 283 to provide protection from weather or precipitation. In addition, the cover 283 may include a light 284 for visibility of a user or provider below.

Figure 2I:
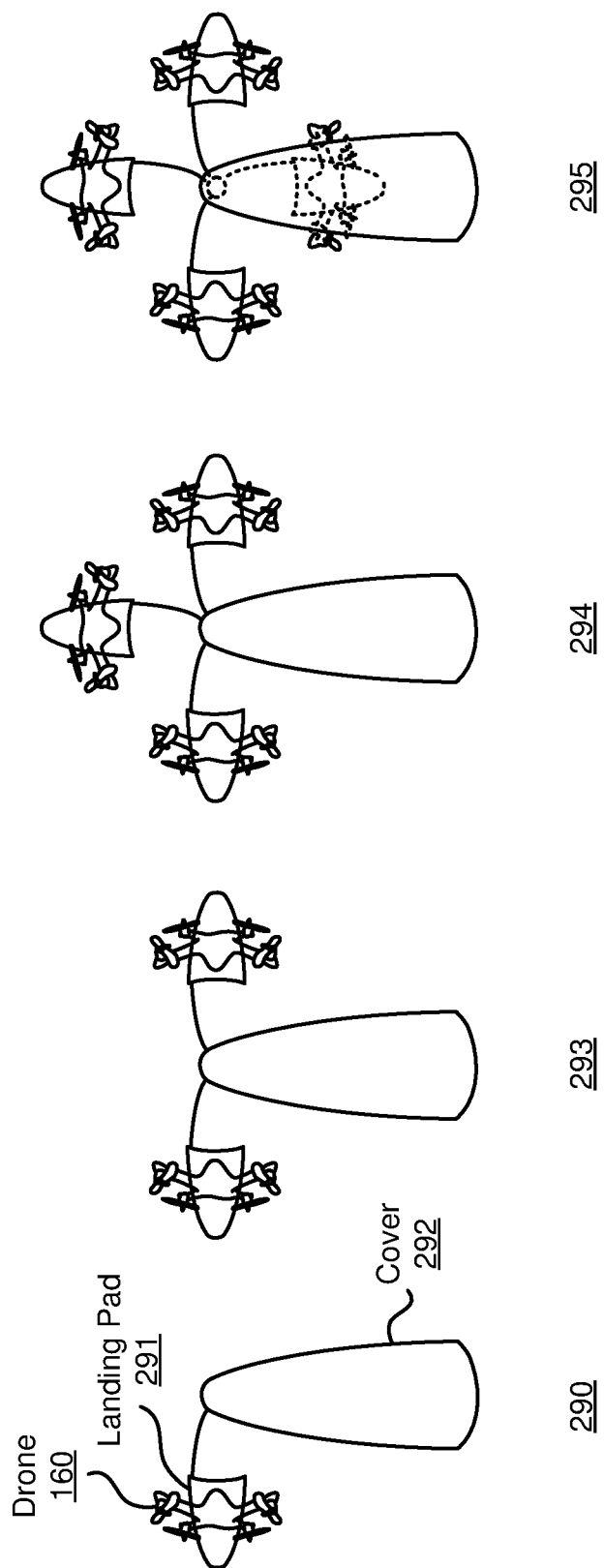
FIG. 2I illustrates configurations of landing pads of a node according to various embodiments.

FIG. 2I illustrates configurations of landing pads of a node according to various embodiments. In the embodiment of node 290, a drone 160 is docked on a landing pad 291 offset from a cover 292. In the embodiment of node 293, two drones 160 are docked on offset landing pads. In the embodiment of node 294, three drones 160 are docked on offset landing pads. In the embodiment of node 295, four drones 160 are docked on offset landing pads, where one of the landing pads overlaps underneath the cover 292.

Example Item Delivery

Figure 3:
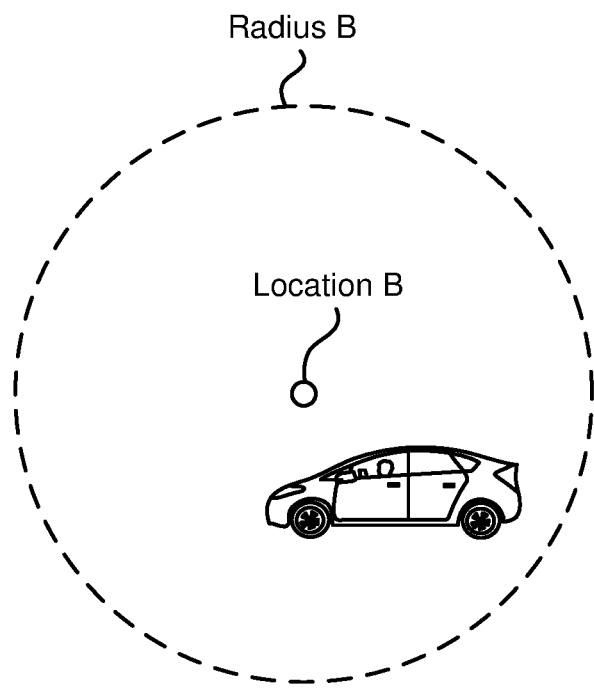
FIG. 3 is a diagram illustrating conventional delivery of items using vehicles.
Figure 3:
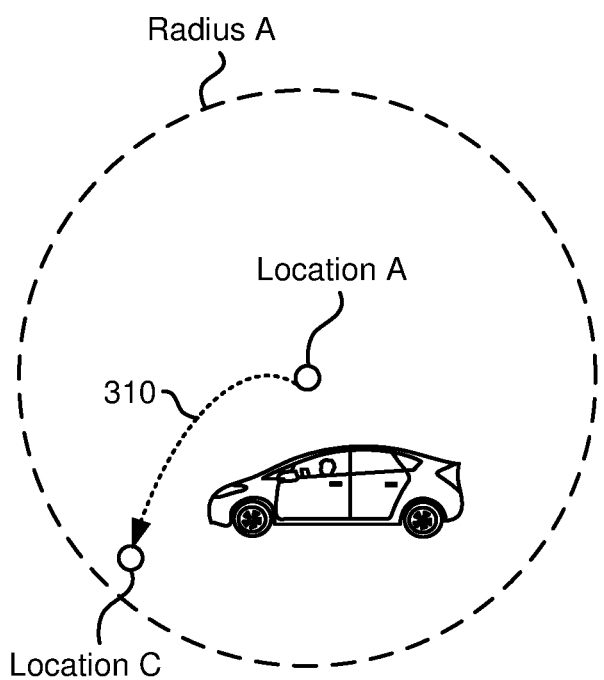

FIG. 3 is a diagram 300 illustrating conventional delivery of items using vehicles. In an example use case, locations A and B correspond to a first and second restaurant, respectively. The first restaurant provides delivery up to a predetermined radius A centered at location A, and the second restaurant provides delivery up to a predetermined radius B centered at location B. A user at location C may receive delivery from the first restaurant because the location C is within the radius A. For example, personnel of the first restaurant drives a vehicle along a route 310 to deliver food to the user. However, the user may not receive delivery from the second restaurant because the location C is outside of the radius B.

Figure 4A:
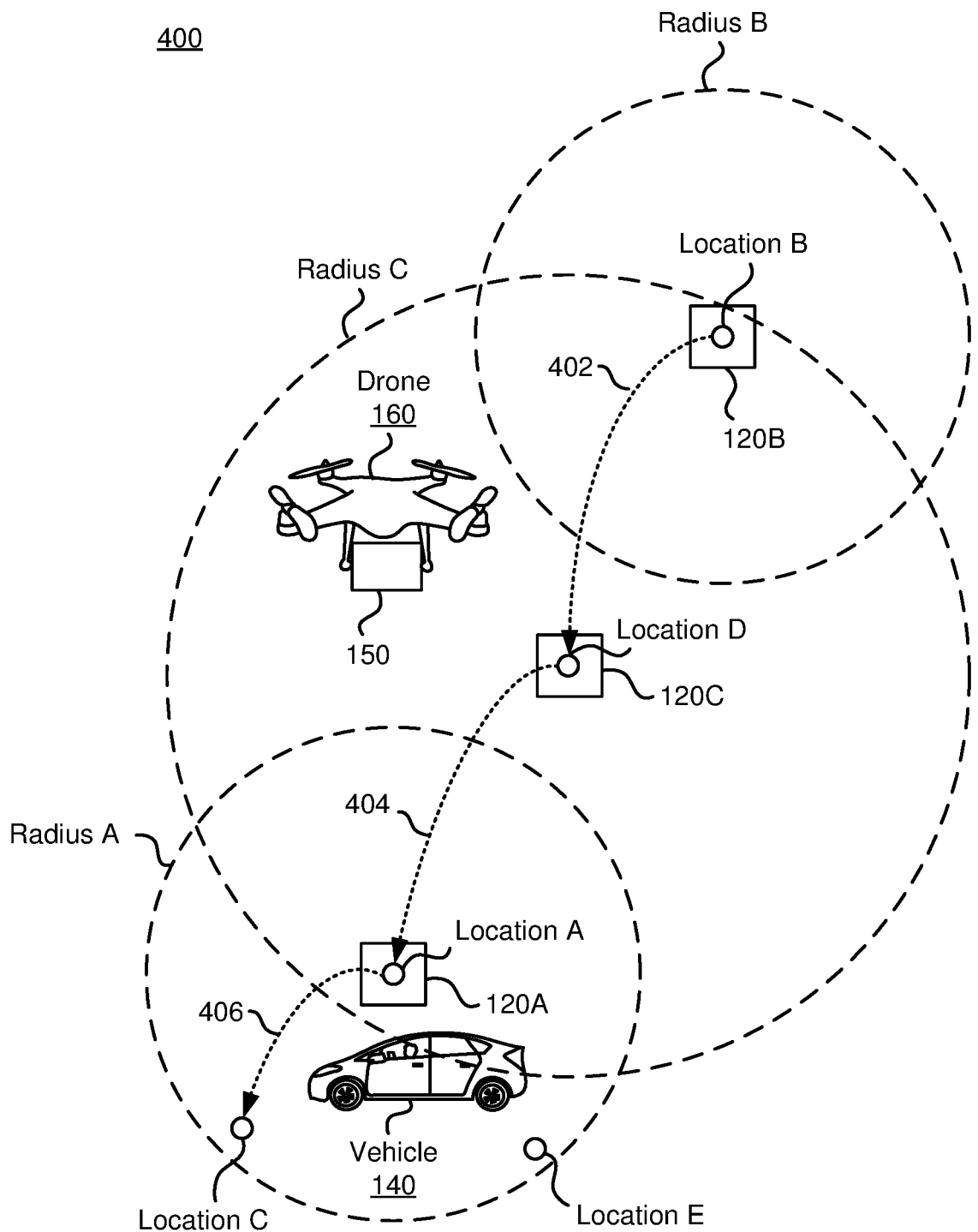
FIG. 4A is a diagram illustrating delivery of items using drones and vehicles according to an embodiment.

FIG. 4A is a diagram 400 illustrating delivery of items using drones and vehicles according to an embodiment. In contrast to the conventional example shown in FIG. 3, the embodiment of FIG. 4A includes nodes 120 for a drone 160. Nodes 120A and 120B are located at location A and location B, respectively. Node 120C is located at location D, which is between locations A and B. Radius C indicates a range (e.g., a delivery range or flight capability range) of the drone 160. For instance, the range represents a distance that the drone 160 may travel, while transporting a certain weight of one or more items 150, before having to recharge a battery of the drone 160 (or receive other types of maintenance). The network system 100 may determine the range of the drone 160 based on information about the drone (e.g., weight, battery capacity, type of propellers or wings, or other mechanical structures), information about an item transported by the drone (e.g., weight or a threshold duration of allowable transport time for perishable goods), map information, weather conditions, or other types of information.

As illustrated in FIG. 4A, since nodes 120A and 120B are both within the radius C of node 120C, the drone 160 may transport an item 150 from node 120B to node 120A by making a stop at node 120C at location D, e.g., an intermediate location. In some embodiments, a first drone 160 transports the item 150 from node 120B to node 120C, and a second drone 160 transports the item 150 from node 120C to node 120A. This may reduce the total delivery time of the item 150 because the network system 100 does not need to wait for the first drone 160 to recharge for flight. That is, the item 150 is transferred to the (e.g., more charged) second drone 160 that is ready to be launched from the node 120C shortly after the first drone 160 has landed.

Accordingly, the network system 100 may increase a range of available delivery of items 150 by using drones 160 to transport the items 150 between nodes 120. In addition, the network system 100 may provide instructions to providers to complete a segment of a delivery. For example, as shown in FIG. 4A, the drone 160 transports the item 150 from node 120B to 120C during a first segment 402 of a route. The drone 160 transports the item 150 from node 120C to 120A during a second segment 404 of the route. A provider picks up the item 150 at the node 120A and transports the item 150 using a vehicle 140 during a third segment 406 of the route to arrive at a destination location, e.g., location C of the user. Thus, in contrast to the example of FIG. 3 only having vehicles for delivery, in the embodiment shown in FIG. 4A, a user at location C may receive delivery of an item 150 from location B.

By coordinating one or more drones 160 and/or providers with vehicles 140, the network system 100 may improve the efficiency of transportation of items 150 for services of the network system 100 and achieve this at large scale. For instance, drones 160 may transport items 150 for segments that are typically more time consuming for vehicles 140, e.g., a busy road or to avoid taking a long detour around a body of water or another type of geographical barrier. Nodes 120 of the network system 100 may be positioned nearby transportation or delivery hubs, for example, nearby a high density of restaurants, suppliers (e.g., having inventory of goods to distribute for food or drink preparation), intersections of a delivery routes, providers, or users. Since not all destination locations may be nearby a node 120 or have an area for a drone 160 to land, providers may deliver items 150 from nodes 120 to destination locations (e.g., "last mile" delivery in the supply chain).

In some embodiments, the network system 100 combines deliveries of items 150. For example, as shown in FIG. 4A, the network system 100 determines that a first user at location C requests delivery of a pizza from a pizza restaurant at location B, and that a second user at location E requests delivery of a burger from a burger restaurant at location D. The network system 100 determines that a drone 160 has the capacity to transport the pizza and the burger at the same time along a shared portion of the routes to the end users. Additionally, the network system 100 may determine that the pizza and burger are both foods that should be kept warm and thus are suitable for being transported together on the drone 160. In particular, the network system 100 provides instructions to personnel of the pizza restaurant, e.g., via a client device 110, to drop off the pizza (e.g., as an item 150 in a receptacle) at the node 120B. The network system 100 provides instructions to the node 120B to provide the pizza to a drone 160 for transportation from the node 120B to the node 120C. Furthermore, the network system 100 provides instructions to personnel of the burger restaurant to drop off the burger at the node 120C. The network system 100 provides instructions to the node 120C to provide the burger to the drone 160 after the drone 160 has landed at the node 120C. The network system 100 provides additional instructions to the node 120C to launch the drone 160 now transporting both the pizza and burger to node 120A.

Following in the above example, the network system 100 may determine an estimated time at which the drone 160 will arrive at node 120A. Based on the estimated time, the network system 100 may identify a first provider and a second provider to deliver the pizza and burger to the users at locations C and E, respectively (in other embodiments, the same provider may deliver both items). The network system 100 provides navigation information to client devices 110 of the first and second providers to navigate to node 120A for pickup of the items 150, e.g., after node 120A receives the items 150 from the drone 160. The navigation information may also include a route from node 120A to the first or second user for delivery by the corresponding provider using a vehicle 140. Accordingly, the network system 100 improves transportation efficiency by determining that delivery routes of the pizza and burger overlap on the segment 404 between nodes 120C and 120A. Though the embodiment shown in FIG. 4A includes one drone 160, three nodes 120A, 120B, and 120C, and one or two providers with a vehicle 140, in practice, the network system 100 coordinates deliveries at large scale including many drones 160, nodes 120, and providers with vehicles 140 (e.g., where any number of the nodes 120 may be part of one of the vehicles 140), and across multiple geographical regions. The coordination may be advantageous, e.g., because the network system can reduce average delivery times, reduce idle time of drones 160 or providers in vehicles 140, reduce redundant delivery routes, and increase the range of services (e.g., delivery of goods of a greater variety of cuisines) provided to users. In some embodiments, a provider can transport an item 150 while also transporting a user for a trip, e.g., for a different service than delivery of the item 150.

In another example use case, the network system 100 provides instructions for drones 160 to distribute items along predetermined routes. For example, a drone 160 receives an item 150 including pizza-making ingredients (e.g., flour, tomatoes, cheese, etc.) from a node 120 at a warehouse. The drone 160 travels on a route including stops at multiple nodes 120 nearby different pizza restaurants. Furthermore, based on estimated turnover or consumption rates of certain ingredients, the network system 100 can schedule deliveries of the items at a given interval such that the pizza restaurants have sufficient supply to meet the demand. In other embodiments, the drones 160 deliver other types of items such as inventory (e.g., consumable or non-consumable goods) to a convenience store. Thus, the restaurants or stores may carry less inventory at a given time, which saves storage space, because their inventory may be replenished at regular intervals via the network system 100.

Figure 4B:
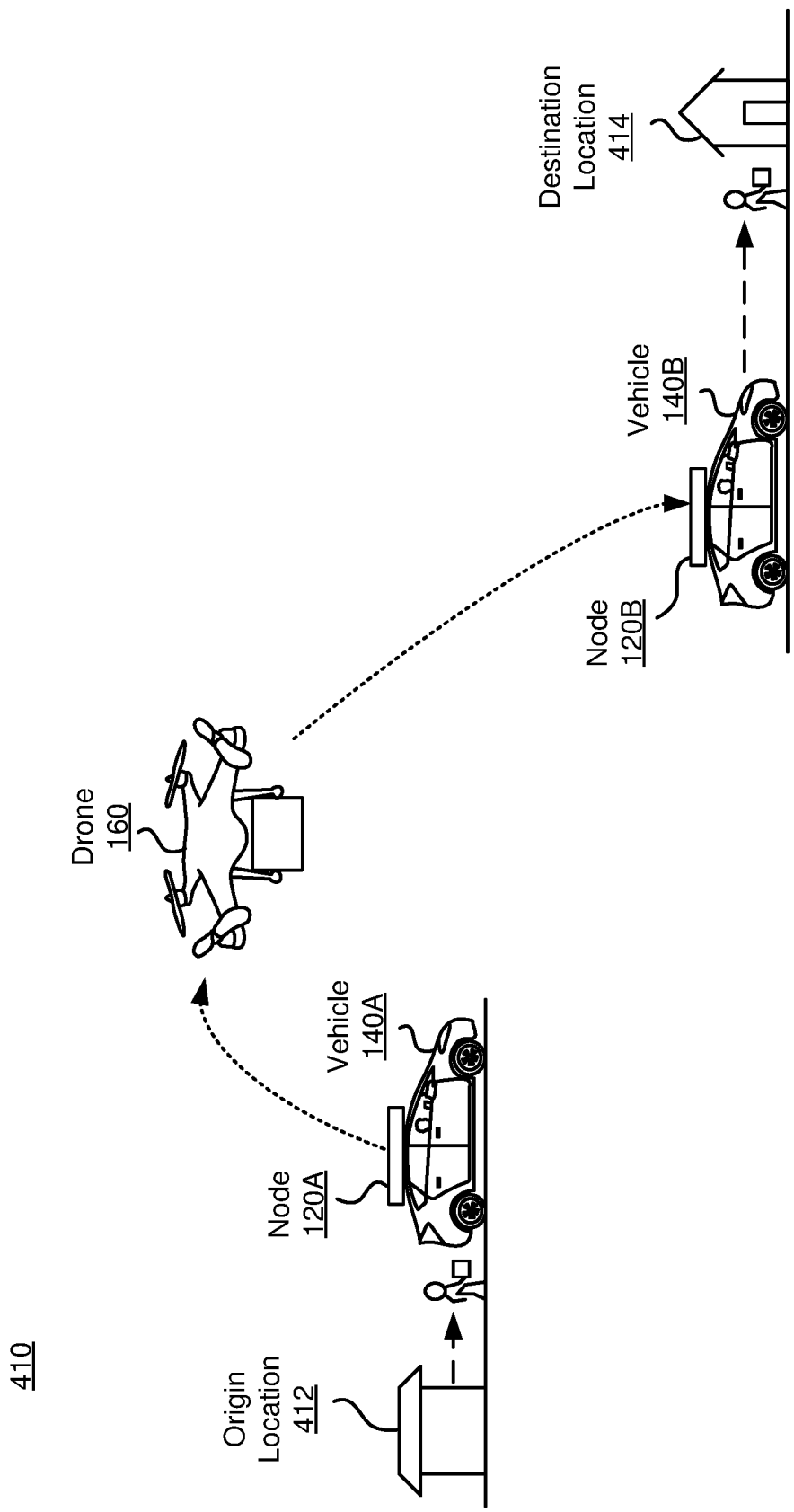
FIG. 4B is a diagram illustrating delivery of items between mobile nodes according to an embodiment.

FIG. 4B is a diagram 410 illustrating delivery of items between mobile nodes according to an embodiment. In an example use case, the network system 100 receives an order for one or more items from a user. For instance, the user orders food from a restaurant, e.g., an item provider. The network system 100 determines an origin location 412 of the items and a destination location 414, e.g., a delivery address of the user such as the user's home or office. The network system 100 determines a route to deliver the items from the origin location 412 to the destination location 414, where at least part of the route is via a drone 160. The route may include waypoints that are associated with stationary or mobile types of nodes 120. The network system 100 provides instructions to a client device 110 of a provider of a vehicle 140A mounted with a first (e.g., mobile) node 120A. In some embodiments, the vehicle 140A and the node 120A are the same. The instructions instruct the provider to navigate to the origin location 412 (or a waypoint nearby the origin location 412) using the vehicle 140A. In embodiments where the vehicle 140A is an autonomous (or semi-autonomous) vehicle, the network system 100 may provide the instructions directly to the vehicle 140A, e.g., instead of instructing a provider to drive the vehicle 140A. A drone 160 may already be docked on the first node 120A while the vehicle 140A is headed to the origin location 412. Alternatively, the network system 100 may provide instructions to the drone 160 to navigate toward the origin location 412 and dock to the first node 120A before or after the vehicle 140A arrives at the origin location 412.

Following in the same example, the network system 100 provides instructions to the restaurant to instruct personnel of the restaurant (e.g., a "runner") to bring the items to the first node 120A. For example, the provider stops the vehicle 140A at a curb, parking lot, or public transit station nearby the restaurant (e.g., a waypoint) and the personnel may carry the items by foot (or bike, scooter, etc.) from the origin location 412 at the restaurant to the vehicle 140A. The personnel or provider may provide the items directly to the drone 160 or indirectly via a drone interface 250 of the first node 120A. The drone 160 may launch from the first node 120A after receiving the items and either before or after the vehicle 140A departs from the origin location 412. For instance, the network system 100 may instruct the provider to navigate the vehicle along a route toward the destination location 414. At a given point along the route, the network system 100 may command the drone 160 to launch from the first node 120A to a second (e.g., mobile) node 120B or a waypoint at which the second node 120B will be located at during a certain period of time. The second node 120B is mounted on another vehicle 140B of another provider of the network system 100. In some embodiments, the second node 120B and the vehicle 140B are the same. In some embodiments, rather than transmitting instructions to the drone 160 to launch (e.g., where the drone 160 uses active mechanisms to navigate and fly), the network system 100 commands the first node 120A to launch the drone 160. The instructions may command the first node 120A to launch the drone 160 with a certain magnitude of force and/or at a given bearing to navigate toward the second node 120B, e.g., such that the drone 160 may glide to the second node 120B without necessarily requiring active mechanisms or expending energy.

The network system 100 transmits instructions to a client device 110 of the provider of the vehicle 140B to navigate to the destination location 414. The network system 100 may command to the drone 160 to dock at the second node 120B after the vehicle 140B has arrived at the destination location 414 or at a nearby waypoint. Alternatively, the network system 100 may instruct the drone 160 to dock at the second node 120B located at a certain waypoint, and the vehicle 140B transports the docked drone 160 (e.g., for the "last mile" of the delivery) to destination location 414. After the vehicle 140B arrives at the destination location 414, the provider may obtain the items from the drone 160 (e.g., directly or indirectly via a drone interface 250 of the second node 120B. Moreover, the provider may deliver the items to the user, e.g., carrying the items by foot from the vehicle 140B to the doorstep of the user's house. In other embodiments, the network system 100 provides a notification to a client device 110 of the user indicating that the items have arrived at the destination location 414. The user may walk to the second node 120B or waypoint to obtain the items from the provider, the drone 160, or the second node 120B.

Figure 4C:
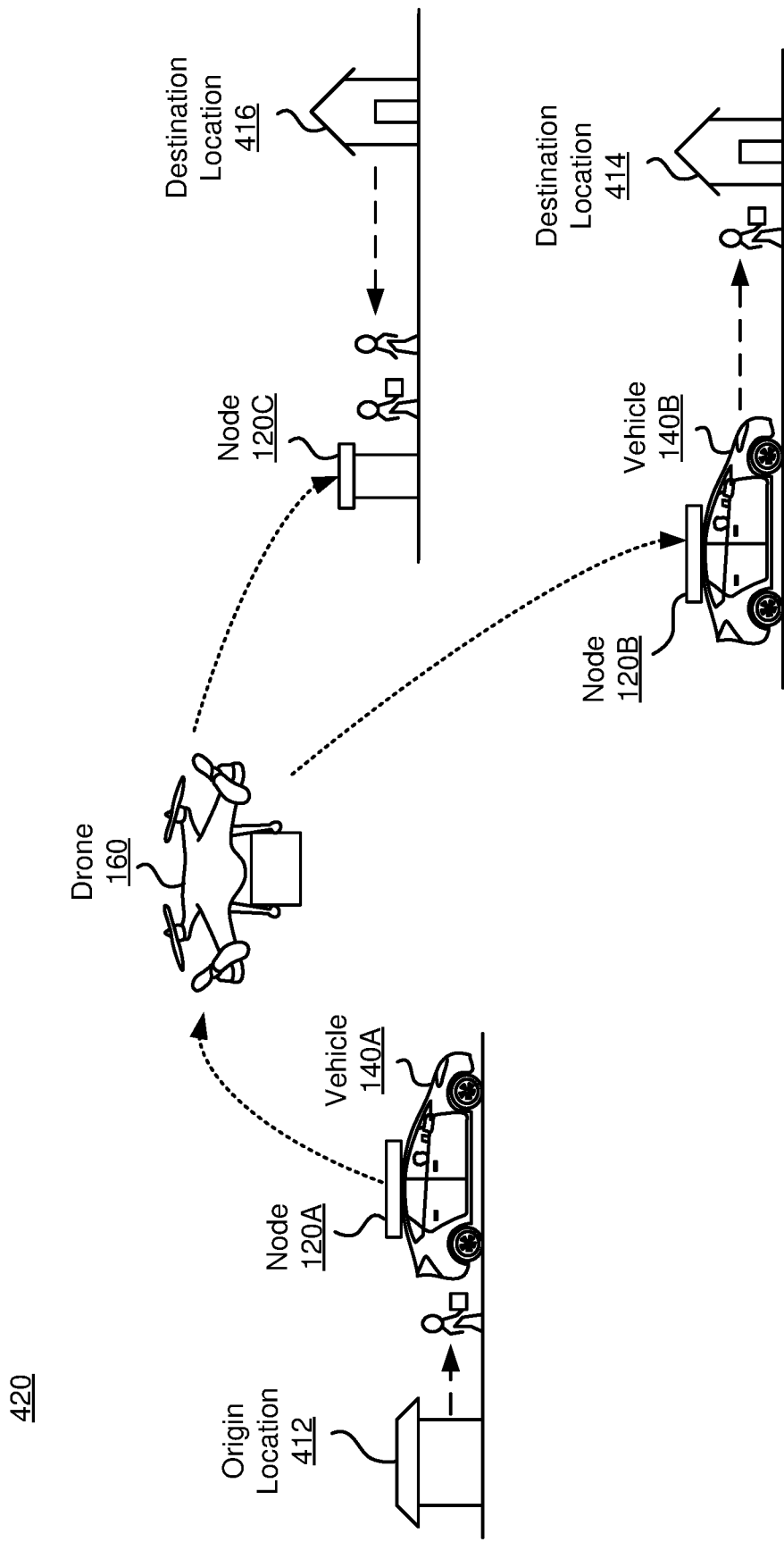
FIG. 4C is a diagram illustrating delivery of items between mobile nodes and stationary nodes according to an embodiment.

FIG. 4C is a diagram 420 illustrating delivery of items between mobile nodes and stationary nodes according to an embodiment. The embodiment shown in FIG. 4C is similar to the example described above with reference to FIG. 4B. However, the diagram 420 of FIG. 4C includes an additional third node 120C that is a stationary node, in contrast to the mobile nodes 120A and 120B mounted on (or as part of) the vehicles 140A and 140B, respectively. For instance, the third node 120C is located at a transit hub, commercial area, or residential area. Responsive to receiving an order from a user at the destination location 416, the network system 100 may determine that the third node 120C is located within a threshold distance from the destination location 416. Responsive to this determination, the network system 100 may provide instructions to the drone 160 to navigate to the third node 120C. In some embodiments, a provider (e.g., or other personnel of the network system 100 or a restaurant associated with the user's order) stationed at the third node 120C obtains the items from the drone 160. The provider may transport the items to the user at the destination location 416. In other use cases, since the third node 120C is nearby the destination location 416, the user may travel by foot to the third node 120C to obtain the items from the provider, or directly from the drone 160 or third node 120C, e.g., when a provider is not stationed at the third node 120C.

Figure 4D:
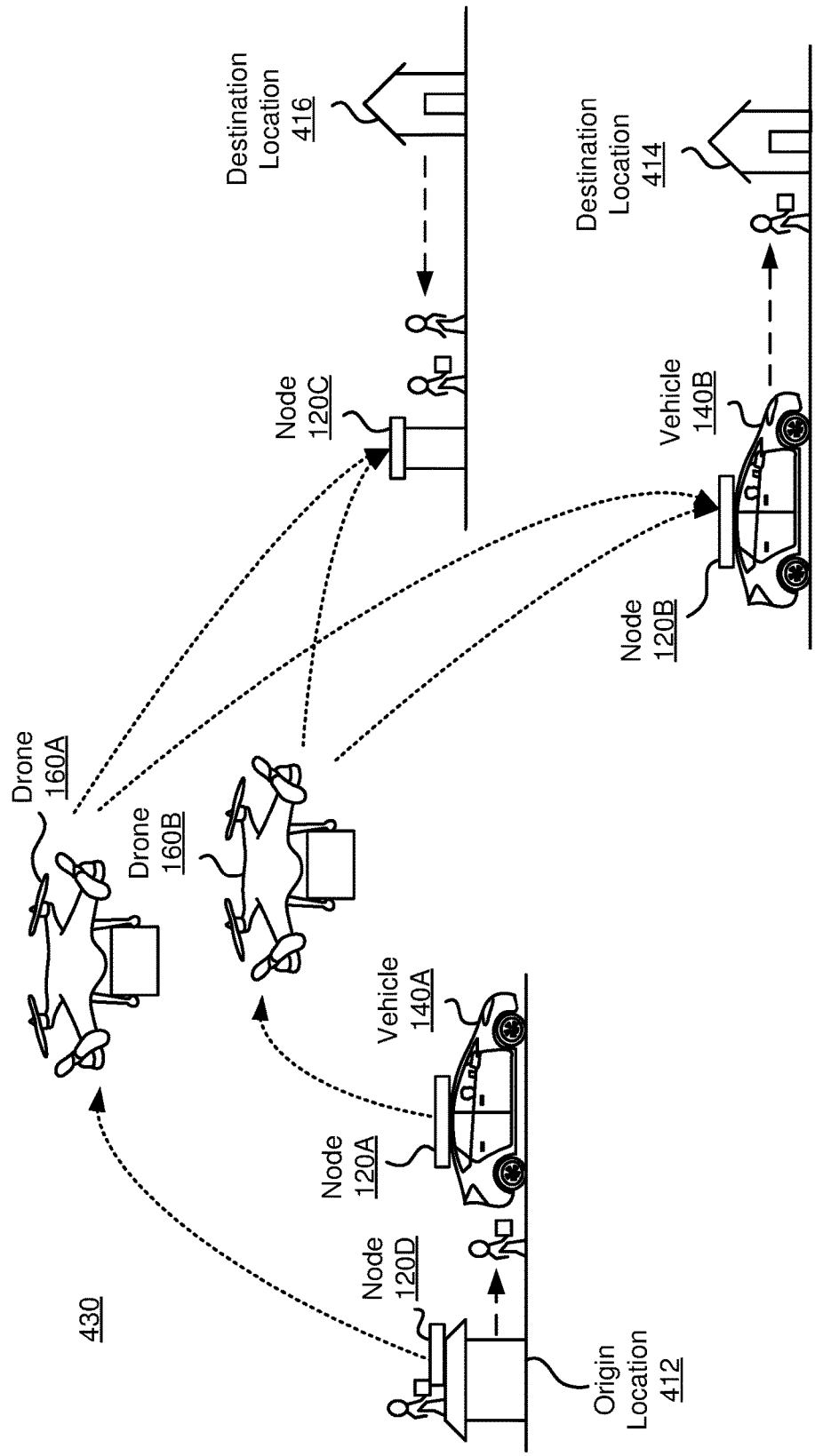
FIG. 4D is another diagram illustrating delivery of items between mobile nodes and stationary nodes according to an embodiment.

FIG. 4D is another diagram 430 illustrating delivery of items between mobile nodes and stationary nodes according to an embodiment. The embodiment shown in FIG. 4D is similar to the example described above with reference to FIG. 4C. However, the diagram 430 of FIG. 4D includes an additional fourth node 120D at the origin location 412. For example, the fourth node 120D is a stationary node that integrated with the restaurant, e.g., mounted to a rooftop of the restaurant building or located outside on the ground near the restaurant building. Personnel of the restaurant may bring items to the fourth node 120D for delivery by a drone 160A to a user at the destination location 416 and may bring other items to the first node 120A for delivery by another drone 160B to another user at the destination location 414.

Figure 4E:
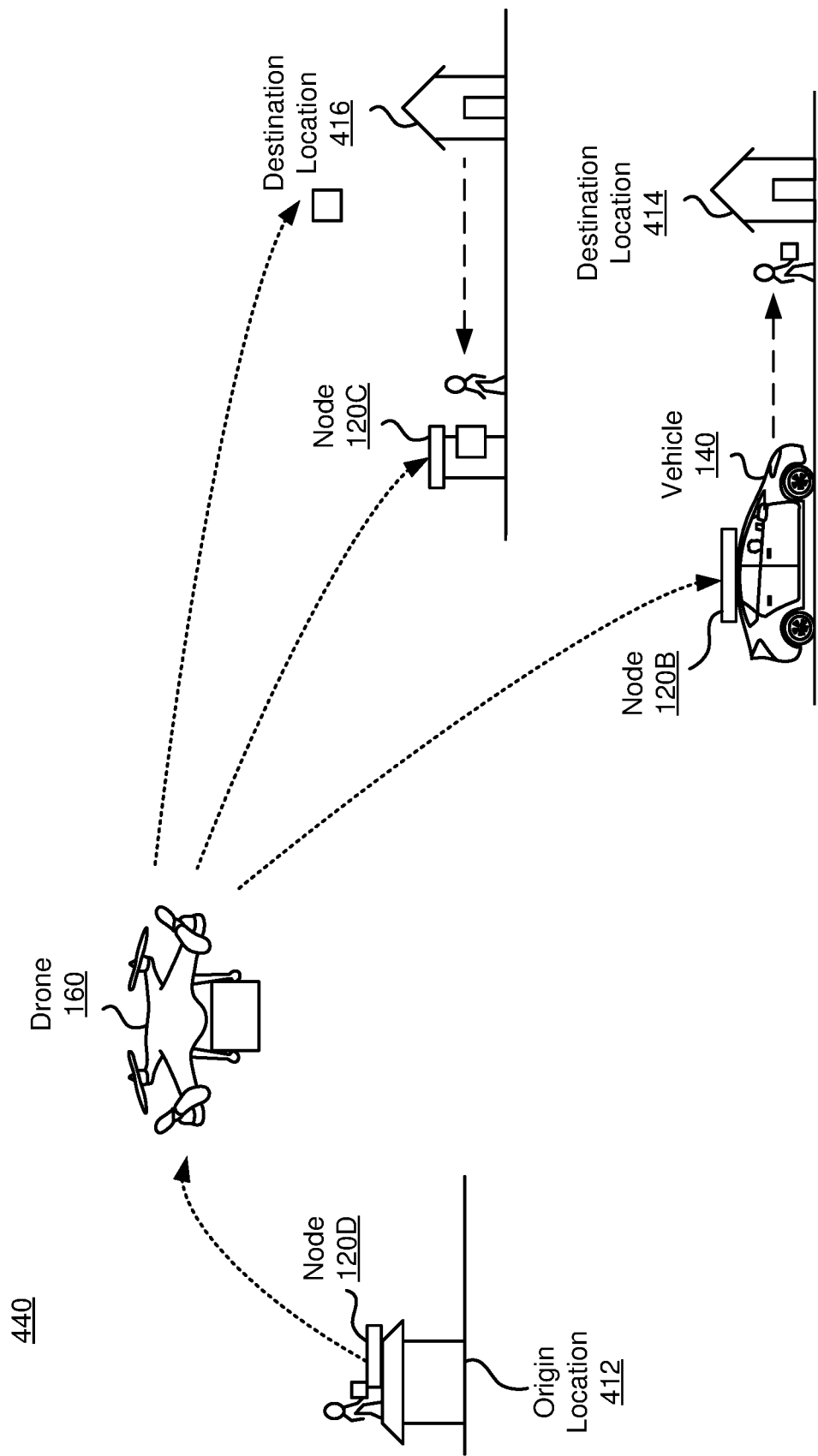
FIG. 4E is yet another diagram illustrating delivery of items between mobile nodes and stationary nodes according to an embodiment.

FIG. 4E is yet another diagram 440 illustrating delivery of items between mobile nodes and stationary nodes according to an embodiment. The embodiment shown in FIG. 4E is similar to the examples described above with reference to FIGS. 4B-D. However, the diagram 440 of FIG. 4D does not include a mobile node at the origin location 412. Moreover, the drone 160 may deliver items to a user at the destination location 416 without necessarily requiring the third node 120C or a mobile node nearby the destination location 416. For instance, the drone 160 may drop off the items on a doorstep, yard, patio, balcony, or other part of the user's house, apartment, office, etc.

The embodiments of FIGS. 4B-E illustrate different routing options that the network system 100 may use to deliver items between nodes using drones 160, which provide advantages over conventional methods of delivery of items, e.g., as shown in FIG. 3. For instance, third parties that have items available to users may use the network system 100 to deliver the items to the users, e.g., instead of developing their own delivery systems, which may require greater set-up costs. A large-scale infrastructure of nodes 120 (e.g., stationary and/or mobile) and providers of the network system 100 allows item providers such as restaurants or stores to deliver items to users across geographical regions at the convenience of the item providers and the end users.

Nodes 120 may be shared among multiple item providers, and the network system 100 can implement load balancing to increase efficient utilization of drones 160 and/or providers operating vehicles 140. For example, responsive to determining that a particular geographical area has an increase in deliveries during a period of time, the network system 100 may instruct additional drones 160 or providers to travel to that geographical area, e.g., from less busy areas during that same period of time. Further, the network system 100 may determine similarities between delivery routes and aggregate deliveries for multiple orders. For instance, the network system 100 may determine a stationary node 120 located at a public area (e.g., a bus stop) nearby multiple restaurants. The network system 100 may instruct the restaurants to transport food orders of users to the node 120, which will be picked up by one or more drones 160 for distribution to the users. Alternatively, the network system 100 may instruct restaurants to transport the food to a certain waypoint and send a mobile node 120 to the waypoint, e.g., instructing a provider to driver a vehicle 140 mounted with or having the mobile node 120 to the waypoint.

In contrast to vehicles that need to travel on roads, drones 160 can navigate in straight-line (or near straight-line) distances in air, as well as routes in air determined using the Haversine formula or law of Haversines (e.g., based on distances between points of a sphere). Thus, delivery by drones 160 may reduce average delivery times as well as fuel, electricity, or labor costs, especially in dense or high-traffic urban areas. Moreover, by using drones 160 for at least part of delivery routes, the network system 100 can reduce or eliminate the need for manual shipping and handling of items, e.g., human labor. Further, in some embodiments, the users have little or no direct interaction with the drones 160, which may help reduce noise pollution and safety incidents between users and drones 160. In some embodiments, for short deliveries less than two miles, delivery by drones 160 via nodes 120 may sometimes be faster than conventional delivery methods. Deliveries between two to seven miles may always be faster by the drones 160. Deliveries greater than seven miles and up to approximately 12 miles may be achievable by the drones 160, but not by conventional delivery methods, within a threshold time, e.g., because it is inefficient for restaurants to have personnel drive roundtrips for those longer distances of delivery routes.

Example Process Flow

Figure 5A:
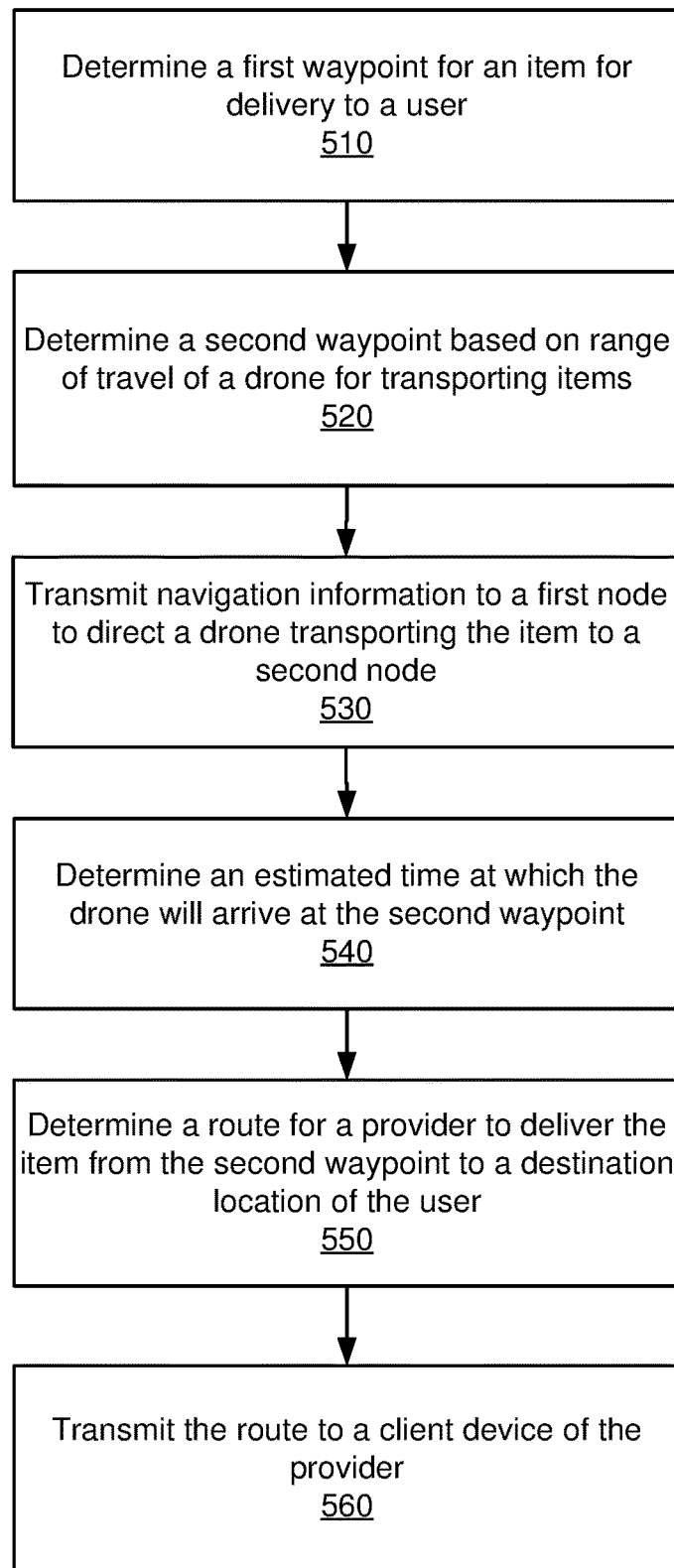
FIG. 5A is a flowchart illustrating a process for providing delivery using a drone according to an embodiment.

FIG. 5A is a flowchart illustrating a process 500 for providing delivery using a drone 160 according to an embodiment. In some embodiments, the network system 100 uses the process 500 within the system environment in FIG. 1. The process 500 may include different or additional steps than those described in conjunction with FIG. 5A in some embodiments or perform steps in different orders than the order described in conjunction with FIG. 5A.

In one embodiment, the network system 100 determines a first waypoint located within a first threshold distance from an origin location of a first item 150 for delivery to a first user of the network system 100 (510). The network system 100 determines a second waypoint located within a second threshold distance from the first waypoint based on a range of travel of a drone 160 (520). The drone 160 is configured for transporting items 150 between nodes located at waypoints. The nodes include at least drone interfaces for navigation of the drone (e.g., launching or landing the drone). The network system 100 transmits navigation information to a first node 120 to direct the drone 160 for transporting the first item 150 from the first waypoint to a second node 120 at the second waypoint (530). The network system 100 determines an estimated time at which the drone 160 will arrive at the second waypoint (540). The network system 100 may predict the estimated time based on map information (e.g., distance to travel), weather conditions, or information about the drone (e.g., flight speed, battery level, or weight of items transported).

The network system 100 determines a first route for a first provider of the network system 100 to deliver the first item 150 from the second waypoint to a first destination location of the first user (550). The first item 150 is ready for pickup at the second waypoint by the first provider at the estimated time. The network system 100 transmits the first route to a first client device 110 of the first provider (560). The network system 100 may provide the first route to the first provider on or after the estimated time. In some embodiments, the network system 100 may provide the first route to the first provider before the estimated time such that the first provider is expected to arrive at the second waypoint by the estimated time (or within a threshold time afterwards). Thus, the network system 100 may reduce an amount of time between drop-off of the item 150 by the drone 160 and pickup of the same item 150 by the first provider.

In some embodiments, the network system 100 determines a second item 150 at the first node 120 for delivery to a second user of the network system 100 at a second destination location within a threshold distance from the second waypoint. Responsive to determining that the drone 160 has capacity to transport the first and second items 150 simultaneously, network system 100 transmits information to the first node 120 to provide the second item 150 to the drone 160 for transport with the first item 150 to the second node 120. The network system 100 determines a second route for a second provider of the network system 100 to deliver the second item 150 from the second node 120 to the second destination location. The network system 100 transmits the second route to a second client device 110 of the second provider.

In other embodiments, the network system 100 transmits a notification regarding delivery of the second item 150 to a client device 110 of the second user according to the predicted destination time, e.g., notifying the second user that the second item 150 is ready for pickup. Further, the network system 100 may transmit a route to the client device for the second user to navigate from the second destination location to the second waypoint.

Figure 5B:
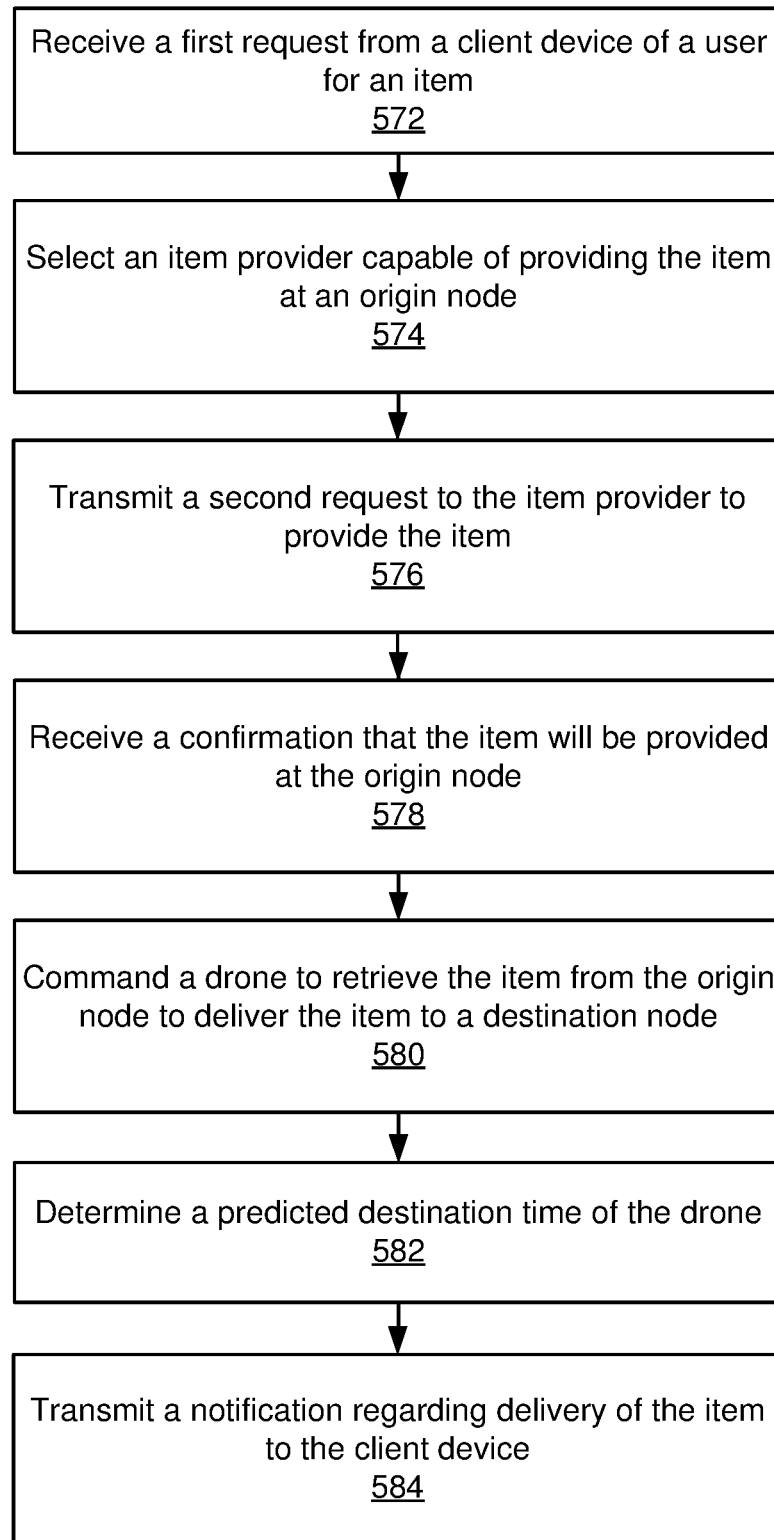
FIG. 5B is a flowchart illustrating another process for providing delivery using a drone according to an embodiment.

FIG. 5B is a flowchart illustrating another process 570 for providing delivery using a drone 160 according to an embodiment. In some embodiments, the network system 100 uses the process 570 within the system environment in FIG. 1. The process 570 may include different or additional steps than those described in conjunction with FIG. 5B in some embodiments or perform steps in different orders than the order described in conjunction with FIG. 5B.

In an embodiment, a server (e.g., of the network system 100) receives a first request from a client device 110 of a user for an item 150, where the first request includes a delivery location for the item 150 (572). The server selects an item provider capable of providing the item 150 at an origin node 120 (574). The server transmits a second request to the item provider to provide the item 150 at the origin node 120 (576). For instance, the second request may indicate that the origin node 120 is stationary at a restaurant or a public transit hub or that the origin node 120 is mobile and will arrive at a waypoint nearby the item provider by an estimated arrival time. The item provider may send a runner to carry the item 150 to the waypoint.

The server receives, from the item provider, a confirmation that the item 150 will be provided at the origin node 120 at a first time (578). The server commands (e.g., by transmitting instructions) a drone 160 to retrieve the item 150 from the origin node 120 not earlier than the first time, and to deliver the item to a destination node 120 (580). The server selects the destination node 120 according to the delivery location for the item. The server determines a predicted destination time indicative of a predicted time at which the drone 160 will deliver the item to the destination node 120 (582). The server transmits a notification regarding delivery of the item 150 to the client device 110 according to the predicted destination time (584).

In some embodiments, the server selects a ground-based vehicle service provider based on a location of the destination node 120. The provider may drive a vehicle 140 to the (e.g., stationary) destination node 120 to pick-up the item 150. Alternatively, the destination node 120 may be mobile and coupled to (or part of) the vehicle 140 of the provider. The server may transmit instructions to the vehicle service provider to transport the item 150 from the destination node 120 to the delivery location at a time not earlier than the predicted destination time.

Example Physical Components of a Computer

Figure 6:
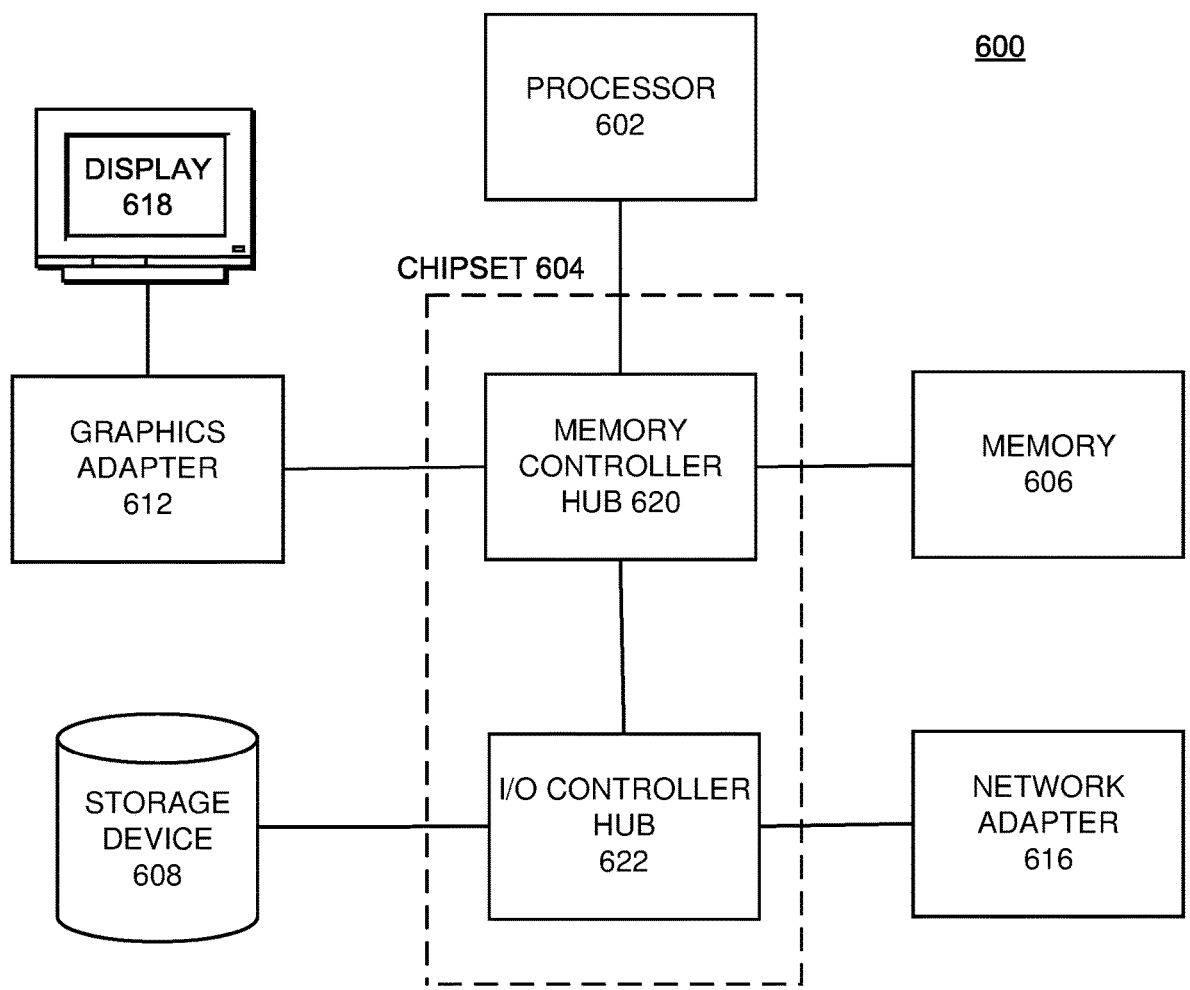
FIG. 6 is a high-level block diagram illustrating physical components of a computer used as part or all of the components from FIG. 1, according to one embodiment.

FIG. 6 is a high-level block diagram illustrating physical components of a computer 600 used as part or all of the components from FIG. 1 (e.g., the network system 100, nodes 120, client devices 110, or drones 160), according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 such as a server or smartphone may lack a graphics adapter 612, and/or display 618, as well as a keyboard or pointing device. Moreover, the storage device 608 can be local and/or remote from the computer 600, e.g., embodied within a storage area network (SAN).

As is known in the art, the computer 600 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 608, loaded into the memory 606, and executed by the processor 602.

Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims

What is claimed is:

1. A method for delivery of items using drones, the method comprising:
   determining, using one or more processors, a first waypoint located within a first threshold distance from an origin location of a first item for delivery to a first user of a network system at a first destination location;
   determining, using the one or more processors, a second waypoint located within a second threshold distance from the first waypoint based on a range of travel of a drone, the drone configured for transporting items between nodes located at waypoints, the nodes including at least drone interfaces for navigation of the drone;
   transmitting navigation information to a first node at the first waypoint to direct the drone for transporting the first item from the first waypoint to a second node at the second waypoint;
   determining, using the one or more processors, a second item at the first node for delivery to a second user of the network system at a second destination location within a third threshold distance from the second waypoint;
   responsive to determining that the drone has capacity to transport the first item and the second item simultaneously, transmitting information to the first node to provide the second item to the drone for transport with the first item to the second node;
   determining, using the one or more processors, an estimated time at which the drone will arrive at the second waypoint;
   determining, using the one or more processors, a first route for a vehicle of a first provider of the network system to deliver the first item from the second waypoint to the first destination location of the first user, the first item ready for pickup at the second waypoint by the first provider at the estimated time; and
   transmitting the first route to a first client device of the first provider.

2. The method of claim 1, further comprising:
   determining, using the one or more processors, a second route for a second provider of the network system to deliver the second item from the second waypoint to the second destination location; and
   transmitting the second route to a second client device of the second provider.

3. The method of claim 1, further comprising:
   determining, using the one or more processors, a predicted destination time, the predicted destination time indicative of a predicted time at which the drone will deliver the second item to the second node; and
   transmitting a notification regarding delivery of the second item to a second client device of the second user according to the predicted destination time.

4. The method of claim 3, wherein the second node is stationary at the second waypoint, the method further comprising:
   transmitting a second route to the second client device for the second user to navigate from the second destination location to the second waypoint.

5. The method of claim 1, further comprising:
   transmitting a second route to a third client device of a third provider to navigate a ground-based vehicle to the first waypoint, the first node coupled to the ground-based vehicle.

6. The method of claim 1, further comprising:
   transmitting a second route to the first client device of the first provider to navigate a ground-based vehicle to the second waypoint, the second node coupled to the ground-based vehicle.

7. The method of claim 1, wherein the first item is provided by an item provider, the first node coupled to a rooftop of a building of the item provider.

8. The method of claim 1, wherein the second node includes a drone interface to receive the first item from the drone, the second node configured to provide the first item to the first provider for pickup via the drone interface.

9. The method of claim 1, wherein a drone interface of the second node includes a fiducial for determining a landing location of the drone at the second waypoint.

10. The method of claim 1, wherein determining the second waypoint located within the second threshold distance from the first waypoint based on the range of travel of the drone accounts for at least a weight of the first item.

11. A method comprising:
    receiving, by a server, a first request from a client device of a first user of a network system for a first item, the first request including a first delivery location for the first item;
    selecting, by the server, an item provider, the item provider capable of providing the first item at an origin node;
    transmitting, by the server, a second request to the item provider to provide the first item at the origin node;
    receiving, by the server from the item provider, a confirmation that the first item will be provided at the origin node at a first time;
    commanding, by the server, a drone to retrieve the first item from the origin node not earlier than the first time, and to deliver the first item to a destination node, the destination node selected according to the first delivery location for the first item, at least one of the origin node and the destination node coupled to a ground-based vehicle;
    determining, by the server, a second item at the origin node for delivery to a second user of the network system at a second delivery location within a threshold distance from the destination node;
    responsive to determining that the drone has capacity to transport the first item and the second item simultaneously, transmitting information to the origin node to provide the second item to the drone for transport with the first item to the destination node;

determining, by the server, a predicted destination time, the predicted destination time indicative of a predicted time at which the drone will deliver the first item to the destination node; and transmitting, by the server, a notification regarding delivery of the first item to the client device according to the predicted destination time.

12. The method of claim 11, further comprising:

transmitting instructions to a vehicle service provider to transport the first item from the destination node to the first delivery location at a time not earlier than the predicted destination time.

13. The method of claim 12, wherein the destination node is coupled to the ground-based vehicle, the ground-based vehicle operated by the vehicle service provider.

14. The method of claim 11, wherein the destination node is stationary, the method further comprising:

transmitting a route to the client device for the first user to navigate from the first delivery location to the destination node.

15. The method of claim 11, further comprising:

transmitting, to the item provider, an estimated time at which the first item can be provided to the origin node, the origin node coupled to the ground-based vehicle.

16. The method of claim 11, wherein the origin node is coupled to a rooftop of a building of the item provider.

17. The method of claim 11, wherein the origin node includes a launch mechanism configured to launch the drone according to locations of the origin and destination nodes, the destination node including a landing pad to dock the drone.

18. A node for delivery of items using drones, the node comprising:
a landing pad configured to:
dock a drone;
charge a battery of the docked drone;
provide a first item to the docked drone;
provide a second item to the docked drone;
a launch mechanism coupled to the landing pad and configured to launch the docked drone having received the second item from the landing pad;
a controller communicatively coupled to the launch mechanism and configured to:
determine that the first item is for delivery to a first user of a network system at a first destination location within a threshold distance from a different node;
determine that the second item is for delivery to a second user of the network system at a second destination location within the threshold distance from the different node; and
responsive to determining that the docked drone has capacity to transport the first item and the second item simultaneously, send instructions to the launch mechanism to launch the docked drone toward the different node.

19. The node of claim 18, further comprising:
a storage configured to:
store the first and second items; and
maintain a target temperature within the storage based on consumable items included in the first and second items.

20. The node of claim 18, wherein the node is configured to be mounted onto a rooftop of a building or a ground-based vehicle, the landing pad including a fiducial for determining a landing location of the drone.

* * * * *